(12) United States Patent
Li et al.

(10) Patent No.: US 12,013,464 B2
(45) Date of Patent: Jun. 18, 2024

(54) ENVIRONMENT SENSING SYSTEM AND MOVABLE PLATFORM

(71) Applicant: SZ DJI TECHNOLOGY CO., LTD., Shenzhen (CN)

(72) Inventors: Wei Li, Shenzhen (CN); Yongjie Huang, Shenzhen (CN); Shaojie Shen, Shenzhen (CN); Lu Ma, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 496 days.

(21) Appl. No.: 17/239,522

(22) Filed: Apr. 23, 2021

(65) Prior Publication Data

US 2021/0255329 A1    Aug. 19, 2021

Related U.S. Application Data

(63) Continuation of application No. PCT/CN2018/112200, filed on Oct. 26, 2018.

(51) Int. Cl.
*G01S 17/931* (2020.01)
*G01S 17/10* (2020.01)
*G01S 17/894* (2020.01)

(52) U.S. Cl.
CPC ............ *G01S 17/931* (2020.01); *G01S 17/10* (2013.01); *G01S 17/894* (2020.01)

(58) Field of Classification Search
CPC ....... G01S 17/931; G01S 17/894; G01S 17/10
USPC ....................................... 340/435
See application file for complete search history.

(56) References Cited

U.S. PATENT DOCUMENTS

| | | | | |
|---|---|---|---|---|
| 10,043,394 | B2 * | 8/2018 | Pink | G01S 17/87 |
| 10,976,437 | B2 * | 4/2021 | Pennecot | G01S 17/93 |
| 11,158,076 | B2 * | 10/2021 | Tsunashima | G06T 7/593 |
| 2010/0245065 | A1 * | 9/2010 | Harada | G01S 15/003 340/435 |

(Continued)

FOREIGN PATENT DOCUMENTS

| | | |
|---|---|---|
| CN | 102944224 A | 2/2013 |
| CN | 205836663 U | 12/2016 |

(Continued)

OTHER PUBLICATIONS

The World Intellectual Property Organization (WIPO) International Search Report for PCT/CN2018/112200 Mar. 20, 2019 6 pages.

*Primary Examiner* — Zhen Y Wu
(74) *Attorney, Agent, or Firm* — ANOVA LAW GROUP, PLLC

(57) ABSTRACT

The present disclosure provides an environment sensing system. The sensing system includes a laser detection module, the laser detection module including a first laser module, a second laser module, a third laser module, and a fourth laser module, a field of view (FOV) angle of each laser module being less than or equal to 120°. The first laser module and the second laser module are disposed on a front side of a movable platform to detect an area in front of the movable platform, the FOVs of the first laser module and the second laser module partially overlap. The third laser module and the fourth laser module are respectively disposed on both sides of the movable platform to detect a front left area and a front right area of the movable platform.

19 Claims, 11 Drawing Sheets

(56) References Cited

U.S. PATENT DOCUMENTS

| | | | | |
|---|---|---|---|---|
| 2014/0062759 A1* | 3/2014 | Morikawa | G01S 17/42 | |
| | | | 342/146 | |
| 2014/0347469 A1* | 11/2014 | Zhang | B60R 1/00 | |
| | | | 348/118 | |
| 2014/0350836 A1 | 11/2014 | Stettner et al. | | |
| 2015/0029487 A1* | 1/2015 | Nakajima | G01S 17/931 | |
| | | | 356/4.01 | |
| 2015/0131080 A1* | 5/2015 | Retterath | G01S 17/10 | |
| | | | 356/5.01 | |
| 2015/0192677 A1* | 7/2015 | Yu | G01S 17/89 | |
| | | | 356/5.01 | |
| 2016/0282468 A1* | 9/2016 | Gruver | H05K 999/99 | |
| 2017/0023678 A1 | 1/2017 | Pink et al. | | |
| 2017/0025019 A1* | 1/2017 | Pink | G01S 17/931 | |
| 2017/0248952 A1* | 8/2017 | Perkins | B60W 60/0059 | |
| 2018/0032822 A1* | 2/2018 | Frank | B60R 1/28 | |
| 2018/0090006 A1* | 3/2018 | Ikenouchi | G01S 7/003 | |
| 2018/0120441 A1* | 5/2018 | Elooz | G01S 7/484 | |
| 2018/0188358 A1* | 7/2018 | Li | G01S 7/487 | |
| 2018/0253105 A1* | 9/2018 | Suzuki | G01C 21/20 | |
| 2018/0288320 A1* | 10/2018 | Melick | G01S 13/931 | |
| 2018/0292529 A1* | 10/2018 | Högasten | G01S 13/89 | |
| 2019/0011567 A1* | 1/2019 | Pacala | G01S 7/4815 | |
| 2019/0049958 A1* | 2/2019 | Liu | G01S 17/00 | |
| 2019/0163178 A1* | 5/2019 | Sidle | G01S 17/87 | |
| 2019/0196001 A1* | 6/2019 | Nemeth | G01S 13/867 | |
| 2019/0202335 A1* | 7/2019 | Hori | B60Q 1/34 | |
| 2019/0225266 A1* | 7/2019 | Enomoto | G01S 13/867 | |
| 2019/0275923 A1* | 9/2019 | Fushimi | G01S 17/87 | |
| 2019/0315344 A1* | 10/2019 | Guibert De Bruet | B60W 10/18 | |
| 2020/0247367 A1* | 8/2020 | Sakai | B60R 11/00 | |
| 2020/0320728 A1* | 10/2020 | Tsunashima | G01C 11/14 | |

FOREIGN PATENT DOCUMENTS

| | | |
|---|---|---|
| CN | 106909152 A | 6/2017 |
| CN | 107351785 A | 11/2017 |
| CN | 107650908 A | 2/2018 |
| CN | 207557480 U | 6/2018 |
| CN | 108332716 A | 7/2018 |
| CN | 108700653 A | 10/2018 |
| CN | 108700665 A | 10/2018 |
| CN | 208000376 U | 10/2018 |
| DE | 102016215301 A1 | 2/2018 |

* cited by examiner

ENVIRONMENT SENSING SYSTEM AND MOVABLE PLATFORM

CROSS-REFERENCE TO RELATED APPLICATIONS

This application is a continuation of International Application No. PCT/CN2018/112200, filed on Oct. 26, 2018, the entire content of which is incorporated herein by reference.

TECHNICAL FIELD

The present disclosure relates to the technical field of self-driving and, more specifically, to an environment sensing system and a movable platform.

BACKGROUND

Self-driving vehicles can realize 360° sensing of the surrounding environment through a plurality of sensors and conduct autonomous navigation to lead passengers to their destinations. Many companies such as Google, Tesla, etc. are designing their own autonomous driving systems, and the selection and position design of different types of sensors will have an important impact on the calibration, environment sensing, control design, and other modules of the autonomous driving system. A good autonomous driving sensor system should meet the following conditions: (1) realizing 360° sensing of the surrounding environment without blind spots; (2) providing reliable and stable environmental sensing data with less redundancy; and (3) being able to calibrate the sensor conveniently and quickly, and meet the needs of real-time calibration result verification.

Different sensors have their own strengths and weaknesses. For example, visible light cameras can detect various vehicles and pedestrians, but there may be a greater probability of false detection in the case of strong or weak lighting. Although lidar cannot provide color information, it can provide stable distance detection information, which is of great significance for automatic obstacle avoidance. However, most of the lidars currently used are expensive and difficult to be embedded in the vehicle body, which is a major obstacle to the wider adaptation of automatous driving technology. In addition, sensors such as wheel odometer, ultrasonic, millimeter wave radar, etc. have important practical value for vehicle navigation and positioning and environment sensing. Therefore, effective configuration and combination of sensors to realize 360° sensing of the surrounding environment and provide stable and reliable data for the calibration and positioning modules in autonomous driving technology is an active area of research.

SUMMARY

One aspect of the present disclosure provides an environment sensing system. The sensing system includes a laser detection module, the laser detection module including a first laser module, a second laser module, a third laser module, and a fourth laser module, a field of view (FOV) angle of each laser module being less than or equal to 120°. The first laser module and the second laser module are disposed on a front side of a movable platform to detect an area in front of the movable platform, the FOVs of the first laser module and the second laser module partially overlap. The third laser module and the fourth laser module are respectively disposed on both sides of the movable platform to detect a front left area and a front right area of the movable platform.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Figure 1:
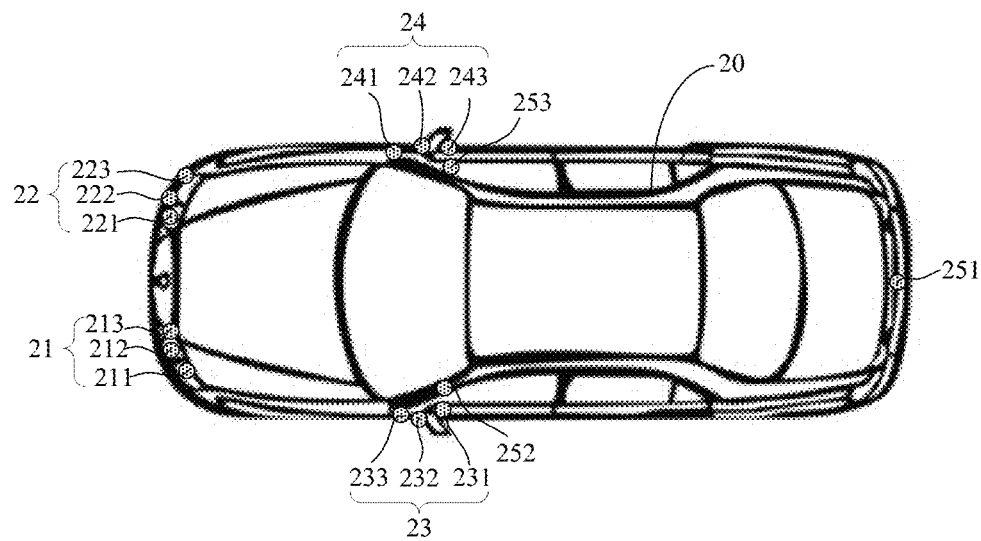
FIG. 1 is a schematic diagram of an arrangement of a laser detection module included in an environment sensing system according to an embodiment of the present disclosure.

In order to make the objectives, technical solutions, and advantages of the present disclosure more clear, the technical solutions in the embodiments of the present disclosure will be described below with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

In the following description, numerous specific details are set forth to provide a more thorough understanding of the present disclosure. However, it will be apparent to one of skill in the art that the present disclosure may be practiced without one or more of these specific details. In other instances, well-known features have not been described in order to avoid obscuring the present disclosure.

It should be understood that the disclosure can be embodied in various forms and should not be construed as limited to the embodiments set forth herein. Rather, these embodiments are provided such that this disclosure may be thorough and complete, and the scope of the disclosure may be conveyed to those skilled in the art.

The terminology used herein is for the purpose of describing the particular embodiments and is not the limit of the present disclosure. The singular forms "a" and "the" are also intent to include plural form, unless otherwise stated in the context. The term "composition" and/or "comprising", when used in the specification, is used to determine the presence of the features, integers, steps, operations, elements and/or components, but does not exclude the presence or addition of one or more other features, integers, steps, operations, elements and/or components. As used herein, the term "and/or" includes any and all combinations of the associated listed items.

In order to fully understand the present disclosure, detailed steps and structures are set forth in the following description in order to explain the disclosure. Exemplary embodiments of the present disclosure are described in detail below, but the present disclosure may have other embodiments in addition to the detailed descriptions below.

In order to effectively configure and combine of sensors to realize 360° sensing of the surrounding environment and provide stable and reliable data for the calibration and positioning modules in autonomous driving technology, an embodiment of the present disclosure provides an environment sensing system. The environment sensing system can be used for sensing the surround environment of a movable platform. The environment sensing system may include a laser detection module, and the laser detection module may include a first laser module, a second laser module, a third laser module, and a fourth laser module, where the field of view of each laser module may be less than or equal to 120°. In some embodiments, the first laser module and the second laser module may be disposed on the front side of the movable platform to detect the area in front of the movable platform. The field of view of the first laser module and the second laser module may partially overlap. The third laser module and the fourth laser module may be respectively disposed on both sides of the movable platform to detect the front left and front right areas of the movable platform.

The environment sensing system of the present disclosure includes a laser detection module, which includes two laser modules arranged on the front side of the movable platform to detect the area in front of the movable platform. In addition, the field of view of the two laser modules arrange on the front side of the movable platform can partially overlap, such that he point cloud density can be higher in the overlapping part, thereby ensuring that there are abundant detection data in front of the movable platform. The laser detection module further includes two laser modules respective arranged on both sides of the movable platform. The tow laser modules can realize the detection of the area in the front left and front area of the movable platform, thereby sensing and detecting the surrounding environment during the movement of the movable platform. Since the field of view of the laser modules included in the environment sensing system is less than or equal to 120°, the range of the field of view is relatively large and can detect a larger area around the movable platform. Therefore, the environment sensing system of the present disclosure can use the laser detection module to provide stable distance detection information, and use fewer laser modules to detect a larger area around the movable platform, which improves the redundancy and reliability of the system, provides superior point cloud density, and realizes the real-time effective sensing of the environment, and reduces cost.

The environment sensing system of the present disclosure will be described in detail below with reference to the accompanying drawings. In the case where there is no conflict between the exemplary embodiments, the features of the following embodiments and examples may be combined with each other.

The environment sensing system can be used for sensing the surrounding environment of the movable platform, such as for collecting platform information and surrounding environment information of the movable platform. In some embodiments, the surrounding environment information may include image information and three-dimensional (3D) coordinate information of the surrounding environment, etc.; and the movable platform may include movable devices such as vehicles, unmanned aerial vehicles (UAVs), airplanes, and ships, and in particular, the movable platform may include unmanned vehicles. In order to thoroughly explain and describe the environment sensing system of the present disclosure below, the case where the environment sensing system is applied to a vehicle will be taken as an example.

In FIG. 1, in order to thoroughly explain and describe the positions of the lidars included in the laser detection module, the lidars are shown in the form of circles. However, it should be understood that FIG. 1 is provided merely for illustration and does not limit the shape of the lidar.

As an example, as shown in FIG. 1, the laser detection module may be embedded in the body of a movable platform 20, for example, embedded in the body of the movable platform such as a vehicle, such that while ensuring the detection range of the laser detection module and the stability of the installation structure, the laser detection module can be hidden to the greatest extent, thereby avoiding affecting the appearance and aesthetics of the movable platform (such as a vehicle).

In one example, as shown in FIG. 1, the environment sensing system of the present disclosure includes a laser detection module, and the laser detection module includes a first laser module 21, a second laser module 22, a third laser module 23, and a fourth laser module 24. The first laser module 21 and the second laser module 22 are disposed on the front side of the movable platform 20 to detect the area in front of the movable platform 20.

The first laser module 21 and the second laser module 22 can be disposed at intervals on the front side of the movable platform 20, and the separation distance may be related to the overlap percentage of the predetermined field of view (FOV) of the two laser modules. Generally, the larger the overlap percentage, the shorter the distance can be set. In one example, the first laser module 21 and the second laser module 22 may be respectively disposed at both ends of the front side of the movable platform. In another example, the movable platform 20 may be a vehicle, and the first laser module 21 and the second laser module 22 may be disposed at the headlight, the front window (e.g., at the top of the window), or the front bumper, etc.

It should be noted the term "in front of" or "forward" of the movable platform as used herein may refer to the direction of travel of the movable platform (such as a vehicle).

In one example, as shown in FIG. 1, the third laser module 23 and the fourth laser module 24 are respectively disposed on both sides of the movable platform to detect the front left and front right areas of the movable platform. In some embodiments, the positions of the third laser module 23 and the fourth laser module 24 can be reasonably set based on the predetermined detection range. For example, the third laser module may be disposed at the front left side of the movable platform, and the fourth laser module may be disposed at front right side of the movable platform. For example, the movable platform may be a vehicle, and the front left side may include the position of the left rearview mirror of the vehicle, the body position between the left rearview mirror and the left wheel, the front position of the left rearview mirror of the vehicle, or the position above the left wheel, etc. Further, the front right side may include the position of the right rearview mirror of the vehicle, the bod position between the right rearview mirror and the right wheel, the front position of the right rearview mirror, or the position above the right wheel, etc. In one example, the movable platform may be a vehicle, and the third laser module 23 and the fourth laser module 24 may be generally disposed at the rearview mirrors on both sides of the vehicle, respectively.

Figure 2:
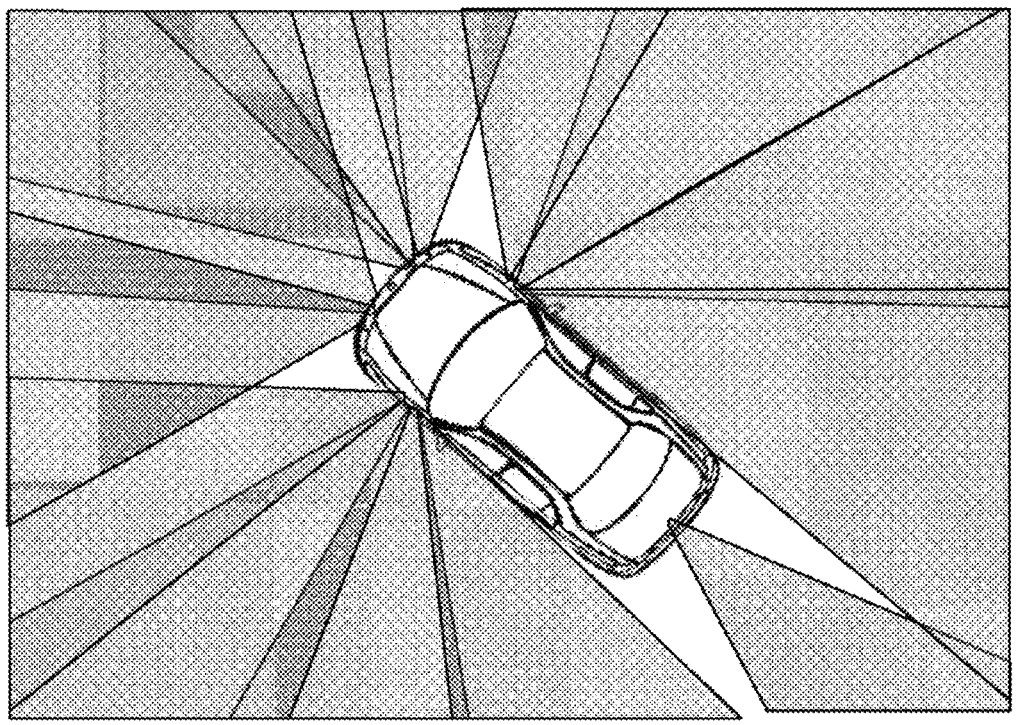
FIG. 2 is a simulation diagram of a detection range of the laser detection module according to an embodiment of the present disclosure.

For example, as shown in FIG. 2, the FOVs of the first laser module and the second laser module partially overlap, the FOVs of the third laser module and the fourth laser module partially overlap, and the FOVs of the second laser module and the fourth laser module partially overlap. The FOVs are partially overlapped, that is, the angles of view are partially overlapped. In particular, the horizontal FOV are partially overlapped, such that the point cloud density is higher in the overlapped part, which ensures that there are abundant detection data in front of the movable platform and improves the detection accuracy. In addition, the FOVs of adjacent laser modules in the first laser module, the second laser module, the third laser module, and the fourth laser module overlap, which can avoid detection blind spots, and can detect larger areas in front, left, and right sides of the movable platform.

In some embodiments, the overlap percentage of the FOVs of the first laser module and the second laser module may be greater than 30% of the FOV of the first laser module or the second laser module, or the overlapping horizontal FOV angle may be greater than 30°. The overlap percentage of the FOVs of the first laser module and the third laser module may be greater than 10% of the FOV of the first laser module or the third laser module, or the overlapping horizontal FOV angle may be greater than 10°. The overlap percentage of the FOVs of the fourth laser module and the second laser module may be greater than 10% of the FOV of the fourth laser module or the second laser module, or the overlapping horizontal FOV angle may be greater than 10°. The overlap percentage of the FOVs of two adjacent laser modules can be set reasonably based on actual detection needs, and is not limited to the percentage provided in the foregoing example.

In some embodiments, the overlap ratio of the first laser module and the second laser module may be greater than the overlap ratio of the first laser module and the third laser module, and the overlap ratio of the second laser module and the fourth laser module. The purpose of this arrangement is to ensure a higher point cloud density in front of the movable platform, and at the same time to enable a larger detection FOV at the front left and front right of the movable platform, and reduce the number of laser modules.

It should be noted that the laser module, that is, the lidar module, mentioned in the present disclosure, may include one or more lidars to detect the external environment. The lidar may be a single-beam scanning lidar or a multi-beam lidar, and the lidar can emit laser beams to detect the distance, position, speed, and other characteristic of a target. Further, the echo intensity information of the lidar can be used for obstacle detection and tracking. In some embodiments, the lidar of the present disclosure may have a FOV close to a cone, and the coverage of the FOV angle is generally 40° to 100°, especially in the range of 40° to 60°. In some embodiments, the optical axis of any lidar included in the laser detection module may face downward, and the angle between the optical axis and the horizontal direction may be between 0° to 10°. This is because the movable platform, such as a vehicle, generally moves on the road surface during the movement process, and when the lidar is set on the movable platform, it may be at a certain height from the road surface. If the optical axis is kept horizontal, part of the beam will be emitted upward, and this part of the detection result will not be very useful to the vehicle. Therefore, if the optical axis of the lidar is facing downwards, and the angle between the optical axis and the horizontal direction is in between 0° to 10°, then lower objects can be detected, thereby improving the detection accuracy and the detection range, and reasonably avoiding obstacles.

In the embodiments of the present disclosure, the FOV of each laser module may be the same or different, and the range of the FOV may be reasonably set and selected based on actual detection needs. In some embodiments, the FOV angle of each laser module may be less than or equal to 120°, in particular, the FOV angle of each laser module may be less than or equal to 100°. In some embodiments, the horizontal FOV of each laser module may range from 40° to 120°. This large FOV can detect a larger area around the movable platform. For example, the FOV of the first laser module, the second laser module, the third laser module, and the fourth laser module may be substantially 100°. The four laser modules can detect the front, left, and right sides of the movable platform (such as a vehicle), such as an area generally ranging from 260° to 280° in the horizontal direction.

In some embodiments, each laser module may include two or more lidars, and the optical axes of the two or more lidars may form a predetermined included angle, such that the FOVs of two adjacent lidars can overlap. In a laser module, the lidars may be calibrated to each other, and the detection data of each lidar in the laser module may be output through one output. In some embodiments, the lidar data in the laser module may be combined and output. From the data receiving end, the data output by the laser module can be used a lidar data, and there is no need to combine the data of each lidar in the laser module. For example, as shown in FIG. 1, the first laser module 21 includes three lidars 211, 212, and 213; the second laser module 22 includes three lidars 221, 222, and 223; the third laser module 23 includes three lidars 231, 232, and 233; and the fourth laser module 24 includes three lidars 241, 242, and 243. The FOVs of the lidars included in the laser modules may have overlapping parts, thereby reducing detection blind spots of the laser module and increasing the point cloud density of the overlapping parts, which can better facilitate the detection of targets around the movable platform. In some embodiments, the angle between the optical axes of two adjacent lidars in each laser module may be determined by the predetermined overlap percentage of the laser module and the size of the FOV of the laser module.

The FOVs of two adjacent lidars may overlap. The size of the overlap may be reasonably set based on the actual FOV of the laser module and the point cloud density requirements of the laser module. The overlapping part may account for the 5% to 90% of the FOV of any lidar, such as 10%, 20%, 30%, 40%, 50%, 60%, 70%, 80%, or 90%. Further, the overlapping part may be greater than 30% and less than 80% of the FOV of a single lidar.

In some embodiments, the FOV of each lidar may be between 30° to 70°, or between 40° to 60°. The overlapping angle of the FOV of two adjacent lidars that make up the laser module may be between 10° to 35°, and the final FOV of the laser module may be between 80° to 130°, or between 90° to 120°.

Figure 3:
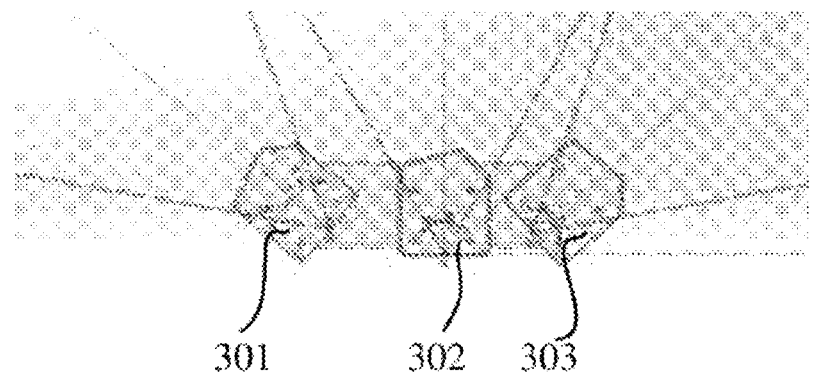
FIG. 3 is a schematic diagram of a laser module according to an embodiment of the present disclosure.

In some embodiments, when there are only two sets of laser modules disposed on the front side of the movable platform, the angle between the central optical axis of one of the laser modules and the front of the movable platform may be between 45° to 75°, further, it may be between 55° to 65°. In one example, as shown in FIG. 3, each laser module includes three lidars 301, 302, and 303, and the optical axes of the three lidars are at a predetermined angle, such that the FOVs of two adjacent lidars overlap. In some embodiments, the lidars 301, 302, and 303 may be single-beam scanning lidars. In some embodiments, the FOV angles of the three lidars 301, 302, and 303 may all be substantially 40°, and the angle between the optical axes of adjacent lidars in the three lidars 301, 302, and 303 may be substantially 30%, such that the three lidars 301, 302, and 303 may form a laser module with a horizontal FOV of substantially 100°, and the overlapping angle of adjacent lidars in this type of laser module may be substantially 10°.

Since the FOV of the lidar decreases when the detection distance of the lidar increases. Therefore, in order for the lidars arranged in front of the movable platform to detect a longer rang, the laser detection module may further include a lidar placed on the front side of the movable platform. The detection distance of the lidar may be greater than the detection distance of the first laser module and the second laser module, and the lidar may have a smaller FOV than the lidars included in the first laser module and the second laser module. In some embodiments, the FOV may be between 10° to 30°, such as 10°, 15°, 20°, 25°, or 30°.

In order to detect the area behind the movable platform, in the embodiments of the present disclosure, as shown in FIG. 1, the laser detection module further includes a first lidar 251 disposed at the rear side of the movable platform 20 to detect the area behind the movable platform 20. In some embodiments, when the movable platform 20 includes a vehicle, the first lidar 251 may be disposed in the vehicle body on the rear side of the movable platform, such as in the body position under the rear window of the vehicle, or in the rear window of the vehicle. In some embodiments, the first lidar 251 may be disposed in the central area on the rear side of the movable platform.

In some embodiments, as shown in FIG. 1, the laser detection module further includes a second lidar 252 and a third lidar 253, which are respectively disposed on both sides of the movable platform 20 to detect areas in the rear left side and the rear right side of the movable platform 20. In some embodiments, the second lidar 252 and the third lidar 253 may be respectively disposed on the front left side and the front right side of the movable platform 20. For example, the second lidar 252 may be adjacent to the third laser module 23, and the third lidar 253 may be adjacent to the fourth laser module 24. The term "adjacent" here means that the corresponding lidar may be close to the corresponding laser module, such that the FOVs between the two can partially overlap. In some embodiments, the second lidar 252 may be disposed above or below the third laser module 23, such that the FOV of the second lidar 252 and the FOV of the third laser module 23 can partially overlap. Further, the third lidar 253 may be disposed above or below the fourth laser module 24, such that the FOV of the third lidar 253 and the FOV of the fourth laser module 24 can partially overlap. In some embodiments, the positional relationship between the second lidar and the third laser module, and the third lidar and the fourth laser module may be other positional relationships, as long as the FOVs of the second lidar and the third laser module can overlap, and the FOVs of the third lidar and the fourth laser module can overlap.

It should be noted that the first lidar, the second lidar, and the third lidar may use the same lidar as the lidar included in the laser module, or other suitable lidars, which are not limited in the embodiments of the present disclosure.

The advantage of using a three-in-one laser module of three lidars is that the three-in-one lidar can have a stronger mechanical structure design, and the calibration can be performed in a specific environment before being installed on the body of the movable platform (such as the body of a vehicle), which can reduce the calibration burden after being installed on the body of the movable platform (such as the body of a vehicle).

An important process of combining data of multiple sensors is the need to calibrate the multiple sensors to provide accurate calibration data and provide correct environmental sensing. A suitable algorithm can be selected for calibration based on the overlapping angle of the FOV between adjacent laser modules. For example, when the overlap of two adjacent laser modules exceeds 30°, the classis iterative closest point (ICP) algorithm can be used for direct calibration; and three separate lidars (the first lidar, the second lidar, and the third lidar) and the adjacent laser modules may have less overlap area, which can be calibrated by using a compensation method based on visual-inertial navigation system (vins).

In the foregoing embodiment, the embedded solution shown in FIG. 1 includes four laser modules (the first laser module, the second laser module, the third laser module, and the fourth laser module) and three lidars (the first lidar, the second lidar, and the third lidar). As a result, under the premise of ensuring that the movable platform (such as a vehicle) can fully detect the surroundings, the minimum number of lidars are used, and there are hat there are abundant detection data in front of the movable platform, which can provide more effective information for the detection module and realize a 360° detection range around the movable platform (such as a vehicle). In addition, based on specific task requirements, laser modules or a single lidar can also be added to other positions on the body of the movable platform (such as the body of a vehicle) to ensure that there is sufficient data to meet the task requirements. As shown in FIG. 2, fifteen lidars are used in the embedded solution, that is, four laser modules and three independent lidars, to achieve a 360° detection range around the movable platform (such as a vehicle).

Figure 4:
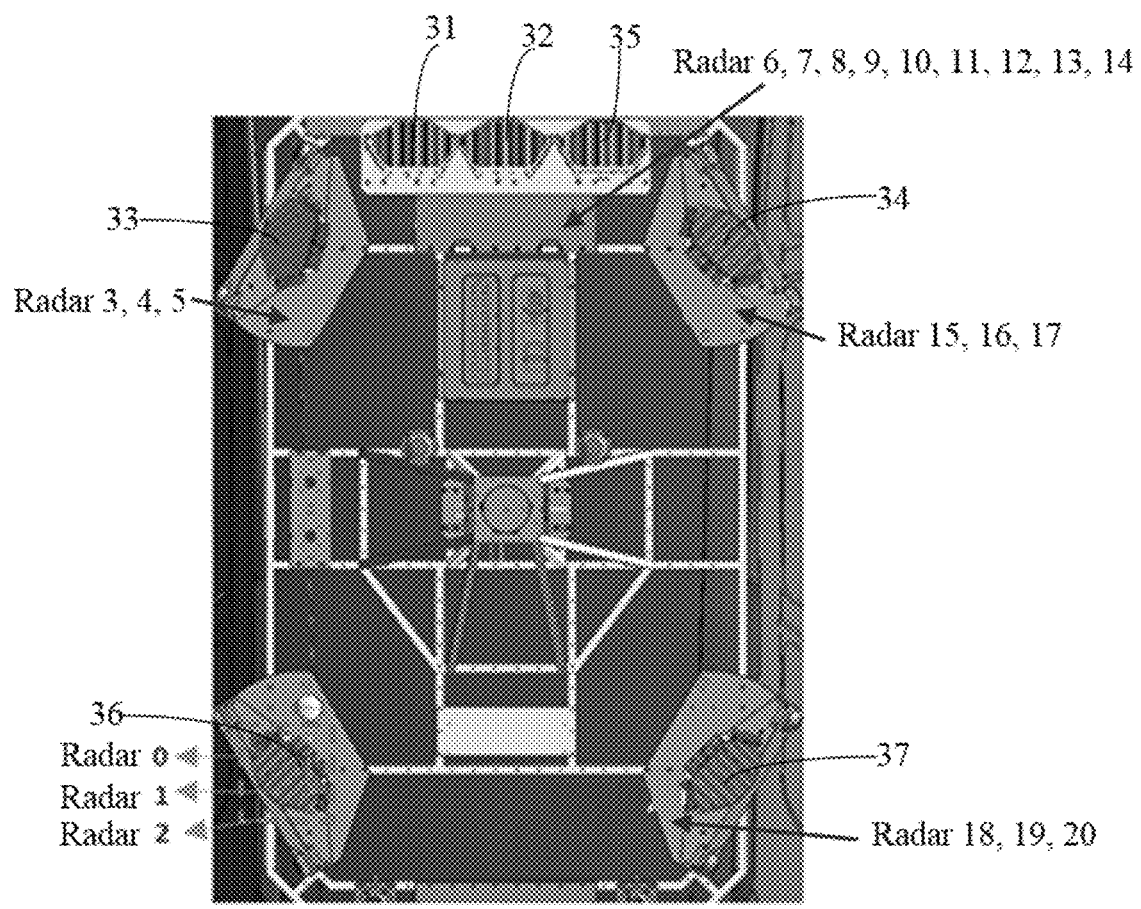
FIG. 4 is a schematic diagram of an arrangement of a plurality of laser detection modules included in the environment sensing system according to another embodiment of the present disclosure.

In addition to the embedded solution described above, the laser detection module of the present disclosure may also be installed outside the body of the movable platform, that is, installed on the outer shell of the movable platform (such as a vehicle). In some embodiments, the embedded solution described above may also be applied to the external solution, that is, the laser detection module embedded in the foregoing embodiment may also be installed outside the body of the movable platform. FIG. 4 is a schematic diagram of an arrangement of a plurality of laser detection modules included in the environment sensing system according to another embodiment of the present disclosure. In this embodiment, the laser detection module includes a first laser module 31, a second laser module 32, and a fifth laser module 35 disposed on the front side of the movable platform to detect the area in front of the movable platform. The FOV angles between two adjacent laser modules may overlap, and the ratio of the overlap may be reasonably set based on the actual FOV and the point cloud density. In one embodiment, the angle between the central optical axis of the first laser module 31, the second laser module 32, and the fifth laser module 35 and the front of the movable platform may be between 0° to 10° (e.g., all along the front of the movable platform). The purpose of setting three laser modules on the front side of the movable platform is to increase the coverage density of the point cloud per unit of time by increasing the number of lidars, thereby achieving a better detection effect in the area in front of the movable platform.

In one embodiment, as shown in FIG. 4, the laser detection module further includes a third laser module 33 and a fourth laser module 34, which are respectively disposed on both sides of the movable platform to detect the font left area and the front right area of the movable platform. In some embodiments, the angle between the central axis of the third laser module 33 and the fourth laser module 34 and the front of the movable platform may be between 30° to 60°, and further, it may be between 40° to 50° (such as substantially 45°). In some embodiments, the third laser module 33 may be disposed on the front left side of the movable platform, and the fourth laser module 34 may be disposed on the front right side of the movable platform. In some embodiments, the FOVs of the third laser module 33 and the first laser module 31 may partially overlap, and the FOVs of the fourth laser module 34 and the fifth laser module 35 may partially overlap.

In one embodiment, as shown in FIG. 4, the laser detection module further includes a sixth laser module 36 and a seventh laser module 37, which are respectively disposed on the left and right sides of the movable platform to detect the rear left area and the rear right area of the movable platform. In some embodiments, the sixth laser module 36 may be disposed on the rear left side of the movable platform, and the seventh laser module 37 may be disposed on the rear right side of the movable platform. In some embodiments, the angle between the central axis of the sixth laser module 36 and the seventh laser module 37 and the front of the movable platform may be between 30° to 60°, and further, it may be between 40° to 50° (such as substantially 45°).

In order to make the detection range of the laser detection module cover the entire area behind the movable platform, the FOV of the sixth laser module 36 and the seventh laser module 37 may partially overlap behind the movable platform. In some embodiments, the overlap percentage of the FOV of the sixth laser module 36 and the FOV of the seventh laser module 37 may be greater than 10% of the FOV of the sixth laser module 36 or the seventh laser module 37, or, the overlapping horizontal FOV angle may be greater than 10°. The percentage and the angle provided above are merely example, and other suitable percentages and the angles may also be applied to the present disclosure.

In this embodiment, the laser module may be the same as the laser module in the previous embodiment. For brevity, the structure and features of the laser module will not be repeated here. As shown in FIG. 4, the first laser module 31 includes lidars 6, 7, and 8; the second laser module 32 includes lidars 9, 10, and 11; the third laser module 33 includes lidars 3, 4, and 5; the fourth laser module 34 includes lidars 15, 16, and 17; the fifth laser module 35 includes lidars 12, 13, and 14; the sixth laser module 36 includes lidars 0, 1, and 2; and the seventh laser module 37 includes lidars 18, 19, and 20.

In some embodiments, the laser detection module may be disposed on a bracket substantially matching the top of the movable platform. The bracket may be detachably mounted on the top of the movable platform, such that the laser detection module can be placed outside the body of the movable platform.

Since the lidar scanning area is generally cone-shaped, and the scanning area of the lidar at different times is different, the coverage density of the point cloud per unit of time can be increased by increasing the number of lidars to achieve better detection results. In order to ensure that there is sufficient lidar data in the forward direction, three sets of laser modules can be set to cover the area directly in front of the movable platform. In addition, based on the needs for data density of different tasks, the number of lidars in each area can be increased or decreased. Through the arrangement of the laser detection module in this embodiment, the lidar can detect all areas around the movable platform (such as a vehicle).

Figure 5A:
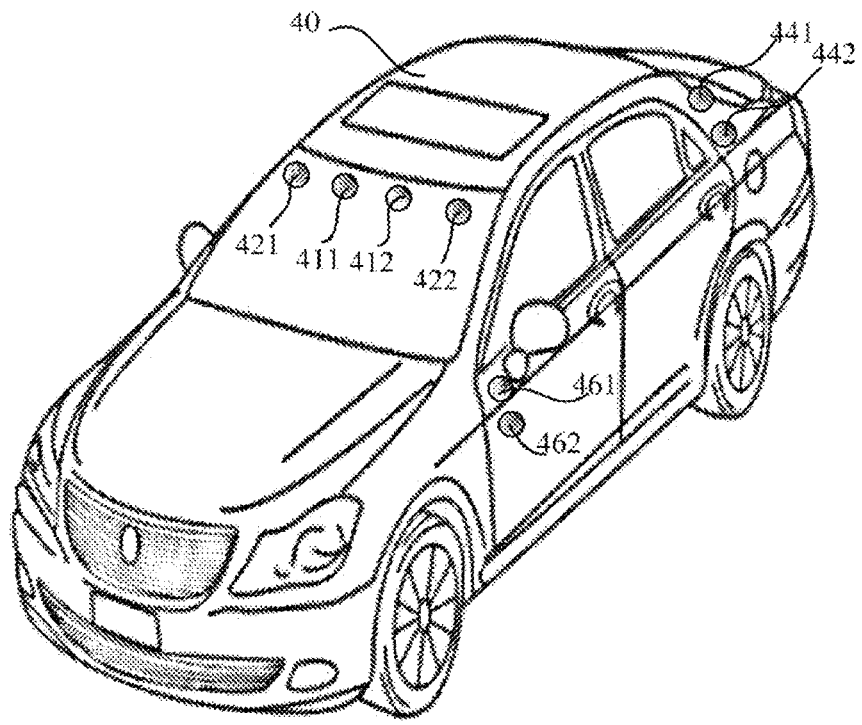
FIG. 5A is a schematic diagram of an arrangement of a plurality of camera modules included in the environment sensing system according to an embodiment of the present disclosure.
Figure 5B:
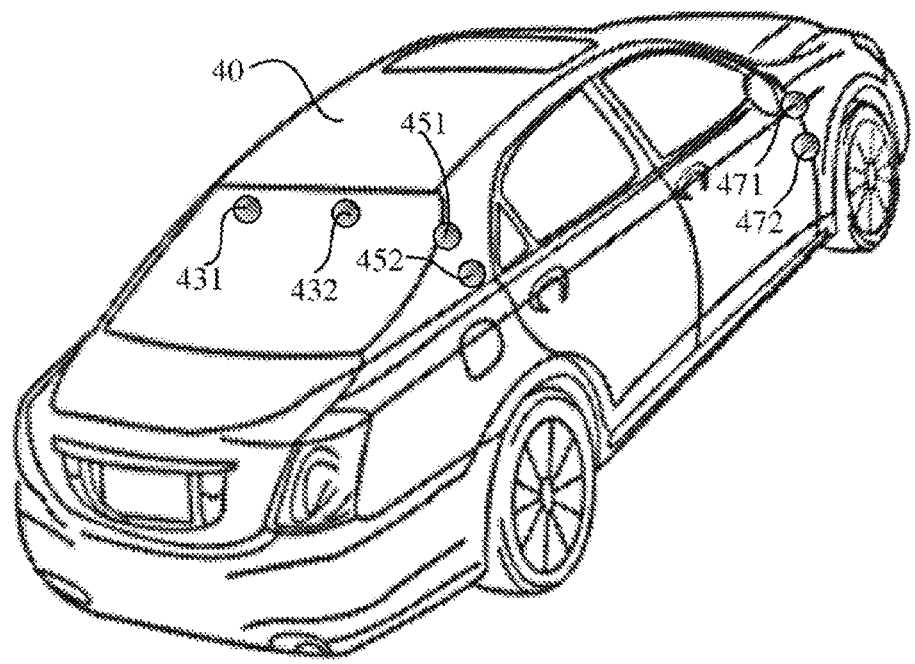
FIG. 5B is another schematic diagram of the arrangement of the plurality of camera modules included in the environment sensing system according to an embodiment of the present disclosure.
Figure 7:
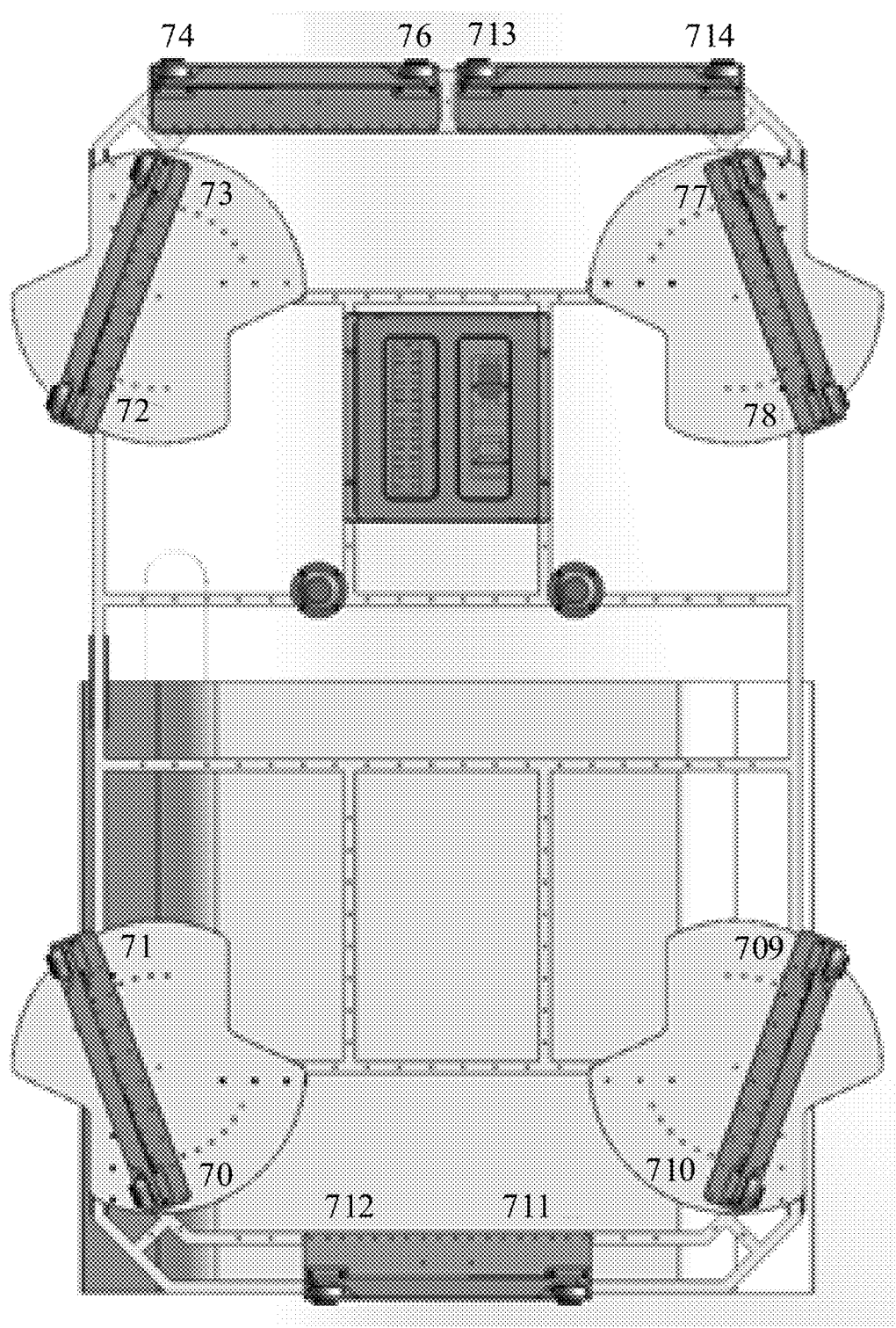
FIG. 7 is a schematic diagram of an arrangement of the plurality of camera modules included in the environment sensing system according to another embodiment of the present disclosure.

In order to realize the detection of image information around the movable platform, the environment sensing system may also include a camera module. The camera module may include a visible light camera module, and the camera module may be embedded in the body of the movable platform. As shown in FIGS. 5A and 5B, the camera module can be embedded in the body of the vehicle, or it can be disposed outside the body of the movable platform. As shown in FIG. 7, the camera module can be placed outside the body of the vehicle.

The following describes the embedded camera module solution with reference to FIG. 5A and FIG. 5B. As shown in FIG. 5A, the camera module includes a first binocular module disposed on the front side of the movable platform to detect the area in front of the movable platform. The camera module also includes a second binocular module disposed on the front side of the movable platform to detect the area in front of the movable platform. In some embodiments, the movable platform includes a vehicle 40, and the first binocular module and the second binocular module are disposed on the front window of the vehicle, especially on the top of the front window, or at other positions on the front side of the vehicle.

In some embodiments, as shown in FIG. 5A, the first binocular module includes two monocular cameras 411 and 412, and the monocular cameras 411 and 412 are disposed at intervals in the horizontal direction. The second binocular module also includes two monocular cameras 421 and 422, and the monocular cameras 421 and 422 are disposed at intervals in the horizontal direction. Further, the two monocular cameras 411 and 412 included in the first binocular module are disposed between the two monocular cameras 421 and 422 included in the second binocular module.

In some embodiments, as shown in FIG. 5B, the camera module further includes a third binocular module disposed on the rear side of the movable platform to detect the area behind the movable platform. The third binocular module includes two monocular cameras 431 and 432, and the monocular cameras 431 and 432 are disposed on the movable platform 40 at intervals along the horizontal direction. In some embodiments, the movable platform may include a vehicle, and the rear side of the vehicle may include, but is not limited to a rear window, and the third binocular module may be disposed on the rear window of the vehicle (e.g., at the top of the rear window).

Figure 6A:
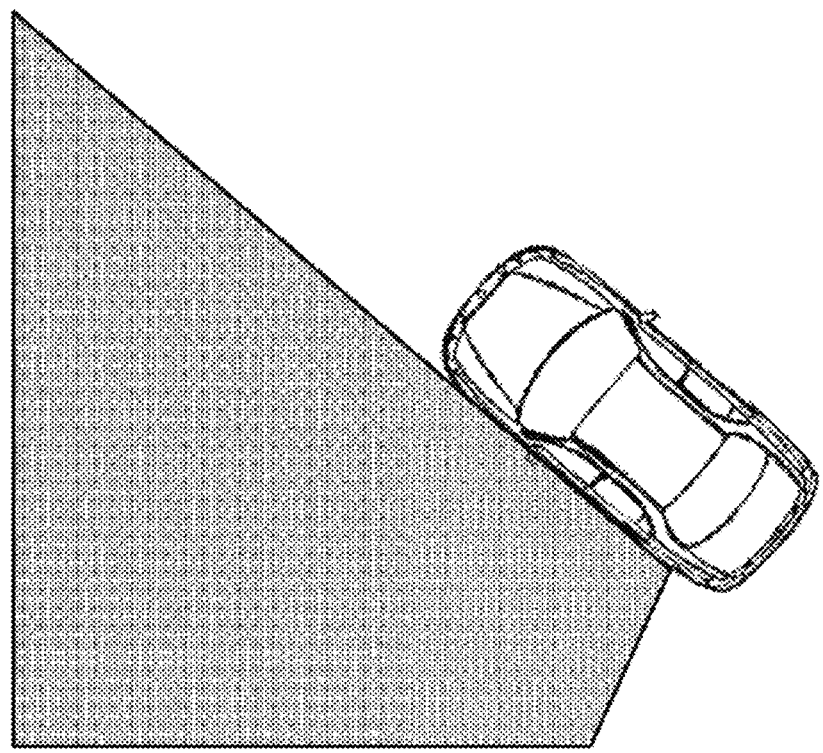
FIG. 6A is a schematic diagram of a simulation of the detection range of the plurality of camera modules according to an embodiment of the present disclosure.
Figure 6B:
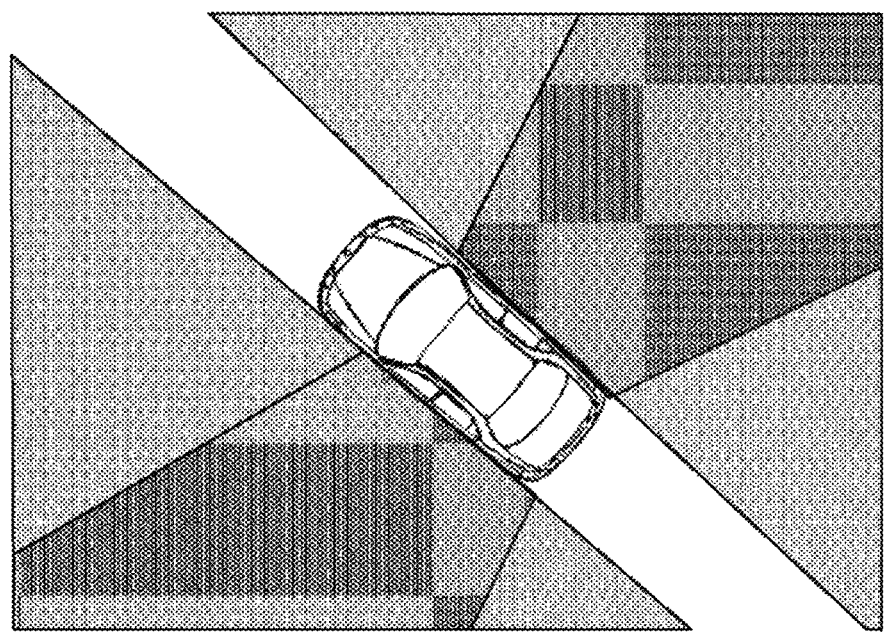
FIG. 6B is a schematic diagram of a simulation of the detection range of the plurality of camera modules according to another embodiment of the present disclosure.
Figure 6C:
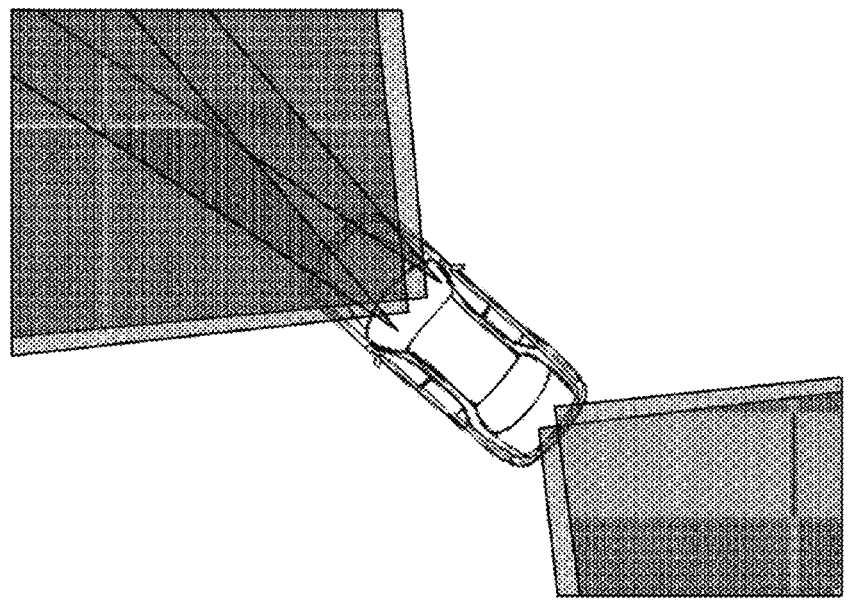
FIG. 6C is a schematic diagram of a simulation of the detection range of the plurality of camera modules according to another embodiment of the present disclosure.

The detection FOV of the first binocular module, the second binocular module, and the third binocular module is shown in FIG. 6C, which shows the top FOV angle. As shown in FIG. 6C, the FOV angles of the first binocular module and the second binocular module have overlapping parts, and their detection FOV angles as a whole cover the range of 90° to 130° in front of the movable platform.

In some embodiments, as shown in FIG. 5A and FIG. 5B, the environment sensing system further includes a camera module. The camera module includes a fourth binocular module and a fifth binocular module, which are respectively disposed on the rear left side and the rear right side of the movable platform to detect the front left area and the front right area of the movable platform. In some embodiments, as shown in FIG. 5A, the fourth binocular module includes two monocular cameras 441 and 442 to detect the front left area of the movable platform. Further, as shown in FIG. 5B, the fifth binocular module includes two monocular cameras 451 and 452 to detect the front right area of the movable platform.

In some embodiments, as shown in FIG. 5A and FIG. 5B, the camera module includes a sixth binocular module and a seventh binocular module, which are respectively disposed on the front left side and the front right side of the movable platform to detect the rear left area and the rear right area of the movable platform. In some embodiments, as shown in FIG. 5A, the sixth binocular module includes two monocular cameras 461 and 462. Further, as shown in FIG. 5B, the fifth binocular module includes two monocular cameras 471 and 472.

In some embodiments, as shown in FIG. 5A and FIG. 5B, the fourth binocular module, the fifth binocular module, the sixth binocular module, and the seventh binocular module all include two monocular cameras disposed at intervals in a vertical direction to form a stereo camera module in the vertical direction. In this way, it is easy to find a suitable position and reduce the difficult of assembly, thereby realizing the detection of lateral targets. In addition, this arrangement is also convenient to observe the area below the movable platform, for example, to observe the road surface of the vehicle.

In some embodiments, the fourth binocular module and the fifth binocular module may be symmetrically disposed on both sides of the movable platform (e.g., such as a vehicle), and the sixth binocular module and the seventh binocular module may be symmetrically disposed on both sides of the movable platform (e.g., such as a vehicle).

As shown in FIG. 6B, the detection areas of the fourth binocular module and the sixth binocular module partially overlap to detect a substantially 180° area on the left side of the movable platform. The detection areas of the fifth binocular module and the seventh binocular module partially overlap to detect a substantially 180° area on the right side of the movable platform.

Figure 6D:
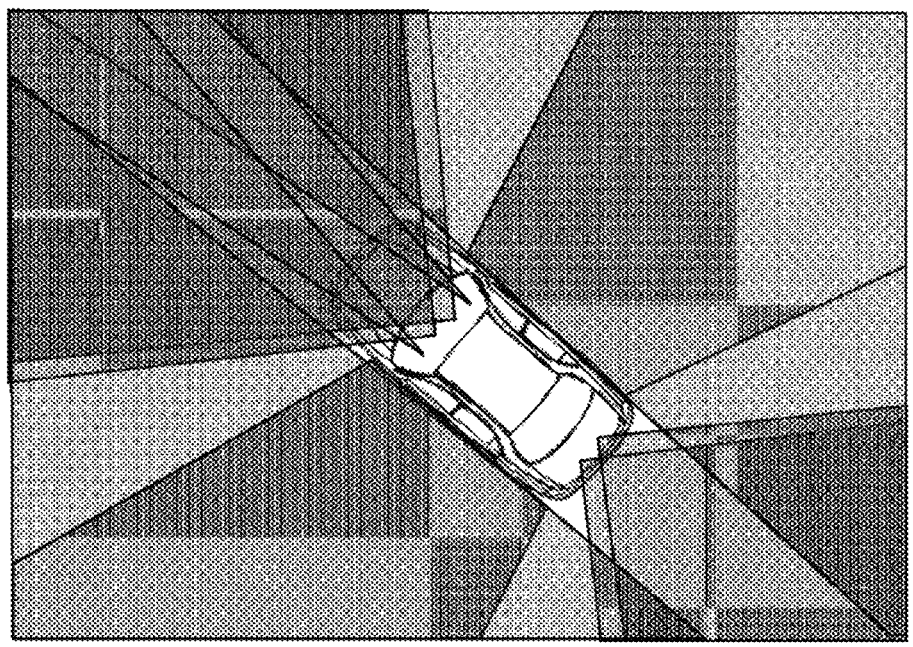
FIG. 6D is a schematic diagram of a simulation of the detection range of the plurality of camera modules according to another embodiment of the present disclosure.

As shown in FIG. 6D, 360° sensing of the surrounding environment of the movable platform can be realized through the above setting of the first to the seventh binocular modules. In addition, since the binocular modules are embedded in the body of the movable platform (e.g., the body of the vehicle), the sensors are hidden to the greatest extent, thereby avoiding affecting the appearance and aesthetics of the vehicle.

The binocular module referred to in the embodiments of the present disclosure may also be a binocular camera module or a stereo camera module, which can also be referred to as a visual sensor, which can be any type of binocular camera well known to those skilled in the art. In this embodiment, the case where the binocular module includes two monocular cameras is taken as an example. In some embodiments, the monocular cameras may include image sensors, and may also include light projectors and other auxiliary devices. The image sensors can use laser scanners, linear and area CCD cameras or TV cameras, or digital cameras, etc., or CMOS image sensors.

Based on the principle of binocular imaging, objects at short distances have large parallax, and objects at long distances have small parallax and greater error. In order to detect objects at a long distance, the length of the binocular baseline can be adjusted to improve the accuracy of long-distance detection, as shown in the following binocular error formula:

$$\nabla z = \frac{z^2}{fT}\epsilon_d$$

where z is the depth of the measured object from the image plane, T is the baseline length, and Ea is the parallax error.

Therefore, based on the above principle, the baseline length of the first binocular module may be shorter than the baseline length of the second binocular module. For example, the baseline length of the first binocular module may be 400 mm, and the baseline length of the second binocular module may be 1000 mm, such that the detection distance of the first binocular module is shorter than the detection distance of the second binocular module. The purpose of installing a second binocular module with a longer detection distance on the front side of the movable platform is to detect more distant obstacles to meet the needs of long-distance obstacle detection in a high-speed environment, to improve the sensing in long-distance environment.

For the third binocular module disposed on the rear side of the movable platform, since the distance to be detected may be shorter than the detection distance of the binocular modules on the sides, the baseline length of the third binocular module may be set to be the same as the baseline length of the first binocular module or other suitable lengths. For example, the baseline length of the third binocular module may be 400 mm.

When the movable platform (such as a vehicle) is travelling, the requirements for the detection distance is not as high as the requirements for the detection angle range, therefore, the baseline length of the binocular module set on the side may be shorter than the baseline length of the binocular module set on the front or rear side. For example, the baseline lengths of the fourth binocular module, the fifth binocular module, the sixth binocular module, and the seventh binocular module may be substantially the same, such as substantially 200 mm. Alternatively, the four binocular modules may also have different baseline lengths, which can be reasonably set based on actual needs.

The FOV of the monocular camera included in the above binocular module can be reasonably set and adjusted based on specific needs. Since the larger the FOC, the closer the detection distance, and the smaller the FOV, the longer the detection distance. Therefore, the FOV of the monocular camera set on the front and back of the movable platform may be larger than the FOV of the monocular camera set on the sides. For example, the FOV of the monocular camera included in the first binocular module may be substantially 83°, the FOV of the monocular camera included in the second binocular module may be substantially 20°, the FOV of the monocular camera included in the third binocular module may be substantially 83°, and the monocular cameras included in the fourth binocular module, the fifth binocular module, the sixth binocular module, and the seventh binocular module may all be substantially 110°.

In some embodiments, the first binocular module may include two monocular cameras, the second binocular module may include two monocular cameras, and the FOV angle of the monocular cameras included in the first binocular module may be greater than the FOV angle of the monocular cameras included in the second binocular module. For example, the FOV angle of the monocular cameras included in the first binocular module may be substantially 83°, and the FOV angle of the monocular cameras included in the second binocular module may be substantially 20°. The purpose of this arrangement is to detect more distant obstacles, to meet the needs of detecting long-distance obstacles in a high-speed environment, and to improve the ability of sensing in long-distance environments.

The technical solution of embedding the camera module in the movable platform (such as the body of a vehicle) has the following advantages. By using the binocular module (also referred to as a stereo camera), a 360° sensing of the surrounding environment can be realized. By using the stereo camera, it can not only provide sufficient data to detect 2D objects of interest, such as pedestrians, vehicles, traffic lights, and traffic signs, but can also provide depth information of these objects to guide vehicles to avoid obstacles or drive more accurately. In addition, by using a stereo camera with smaller FOV angle (such as the second binocular module), an obstacle detection distance of 200 m can be reached, which can meet the needs of long-distance obstacle detection in a high-speed environment.

In another embodiment of the present disclosure, the camera module may also be externally mounted outside the body of the movable platform, such as externally mounted outside the body of the vehicle. The camera module may be externally mounted in any suitable way. For example, as shown in FIG. 7, the camera module is disposed on a bracket substantially matching the top of the movable platform. The bracket may be detachably mounted on the top of the movable platform, such that the camera module can be placed outside the body of the movable platform.

As shown in FIG. 7, in the external arrangement technical solution, the camera module includes a first binocular module and a second binocular module, which are disposed on the front side of the movable platform, that is, the front side of the bracket, to detect the area in front of the movable platform. The first binocular module includes two monocular cameras 74 and 76, and the second binocular module includes two monocular cameras 713 and 714. In some embodiments, the FOV angle of the monocular cameras included in the first binocular module may be smaller than the FOV angle of the monocular cameras included in the second binocular module. For example, the FOV angle of the two monocular cameras 74 and 76 may be substantially 83°, and the FOV angle of the two monocular cameras 713 and 714 may be substantially 20°, therefore, the detection distance of the second binocular module can be farther than the detection distance of the first binocular module. In this way, an equivalent of two sets of binocular modules with a longer detection distance and a set of module with shorter detection distance can be arranged on the front side of the movable platform (that is, the front side of the bracket). by using a stereo camera with smaller FOV angle (such as the second binocular module), an obstacle detection distance of 200 m can be reached, which can meet the needs of long-distance obstacle detection in a high-speed environment In some embodiments, the camera module may further include a third binocular module disposed on the rear side of the movable platform, that is, the rear side of the bracket, to detect the rear area. The camera module may further include a fourth binocular module and a fifth binocular module respectively disposed on the rear left side and the rear right side of the movable platform, that is, the rear left side and the rear right side of the bracket, to detect the front left area and the front right area. The camera module may further include a sixth binocular module and a seventh binocular module respectively disposed on the front left side and the front right side of the movable platform, that is, the front left side and the front right side of the bracket, to detect the rear left area and the rear right area. In some embodiments, the fourth binocular module and the fifth binocular module may be symmetrically arranged, and the sixth binocular module and the seventh binocular module may also be symmetrically arranged.

In another embodiment, as shown in FIG. 7, the camera module further includes a fourth binocular module, a fifth binocular module, a sixth binocular module, and a seventh binocular module. The fourth binocular module includes two monocular cameras 70 and 71, the fifth binocular module includes two monocular cameras 709 and 710, the sixth binocular module includes two monocular cameras 72 and 73, and the seventh binocular module includes two monocular cameras 77 and 78. The fourth binocular module is disposed on the rear left of the movable platform to detect the rear left area, the fifth binocular module is disposed on the rear right of the movable platform to detect the rear right area, the sixth binocular module is disposed on the front left of the movable platform to detect the front left area, and the seventh binocular module is disposed on the front right of the movable platform to detect the front right area. In some embodiments, the fourth binocular module and the fifth binocular module may be disposed symmetrically, and the sixth binocular module and the seventh binocular module may also be disposed symmetrically.

When arranging the binocular modules described above, the FOV angles of any two adjacent binocular modules may have an overlapping part, and the ratio of the overlapping part may be reasonably set based on actual needs, which is not limited in the embodiments of the present disclosure.

In the external arrangement technical solution, the first binocular module and the third binocular module to the seventh binocular module may use monocular cameras with the same FOV angle, or monocular cameras with different FOV angles. For example, the first binocular module and the third binocular module to the seventh binocular module may use monocular cameras with the same FOV angle, such as a monocular camera with a FOV angle of substantially 83°.

In some embodiments, the first binocular module and the third binocular module to the seventh binocular module may use monocular cameras with the same configuration. The symmetrical arrangement of the front and rear binocular modules and the symmetrical arrangement of the left and right binocular modules are easy to place and the suitable positions are easy to identify, thereby reducing the difficulty of assembly. Since the configuration of each pair of binocular modules in a symmetrical arrangement may be the same, it is more convenient to prepare the modules and calibrate the sensors in batch. If there is a problem with the sensor, the module can also be replaced immediately, thereby reducing the difficulty of system maintenance.

In addition, in the embodiments of the present disclosure, the position of the camera and the camera composition of the binocular module can also be appropriately adjusted based on specific needs.

Figure 8:
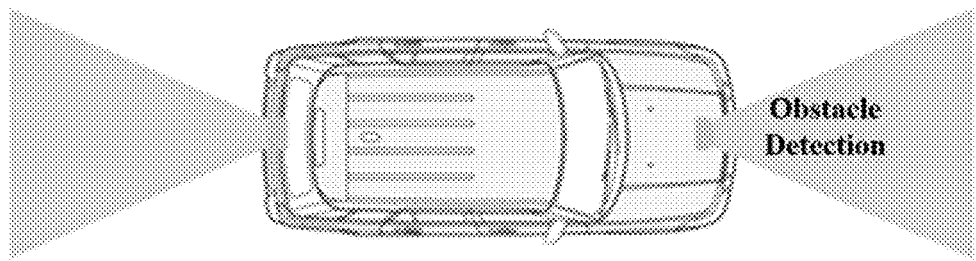
FIG. 8 is a schematic diagram of an arrangement of a plurality of millimeter wave radar modules included in the environment sensing system according to an embodiment of the present disclosure.

In some embodiments, as shown in FIG. 8, the environment sensing system also include millimeter wave radar modules disposed on the front and rear sides of the movable platform to monitoring moving objects and obstacles. In some embodiments, the detection distance of the millimeter wave radar module may be greater than the detection distance of the lidar module. In some embodiments, the millimeter wave radar module may be disposed in a movable platform, such as a vehicle body.

The millimeter wave radar has stable detection performance and is not affected by the color and texture of the object surface. It has strong penetrating power. The distance measuring accuracy is less affected by the environment, and the detection distance is relative long, which can meet the needs of environment monitoring in a long distance range, and is a good supplement to laser and visible light cameras. The millimeter wave radar is mainly placed in the front and rear of the vehicle to meet the needs to long-distance monitoring of moving objects and obstacles.

Figure 9:
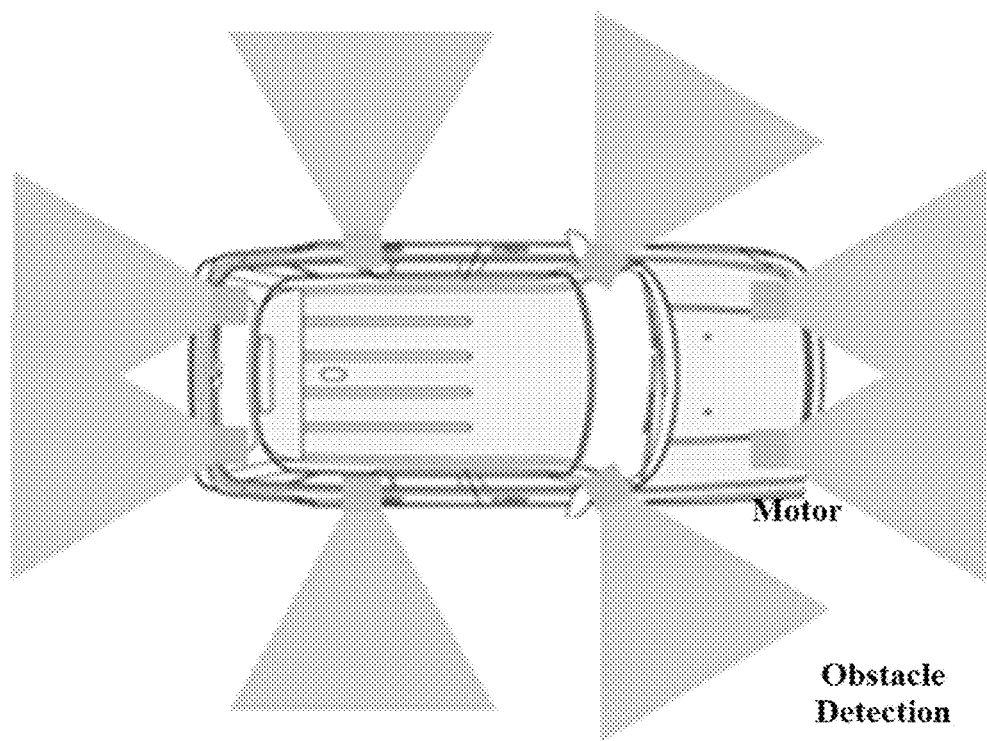
FIG. 9 is a schematic diagram of an arrangement of a plurality of ultrasonic modules included in the environment sensing system according to an embodiment of the present disclosure.

In some embodiments, as shown in FIG. 9, the environment sensing system further includes a plurality of ultrasonic sensors. Two ultrasonic sensors are respectively disposed on the front side, rear side, left side, and right side of the movable platform. The two ultrasonic sensors on each side are disposed at intervals, where the two ultrasonic sensors on the left can detect the areas on the front left and the rear left, and the two ultrasonic sensors on the right can detect the areas on the front right and rear right, respectively.

Ultrasonic sensors can operate reliably in harsh environments, such as dirt, dust, or fog, and are not affected by the target's color, reflectivity, texture, etc., and can accurately detect even small targets. In addition, the ultrasonic sensors are relatively small in size and easy to install, and can effectively detect the short-distance area of a movable platform (such as a vehicle) to make up for the blind spots of other sensors. In some embodiments, two ultrasonic sensor may be placed on the front, rear, left, and right sides of the movable platform (such as a vehicle). Each sensor may be equipped with a motor to control the rotation of the ultrasonic sensor to avoid monitoring blind spots. The effective monitoring distance of each sensor may be within 10 m. Through the control of motor, the short-distance area of the movable platform (such as a vehicle) can be fully covered, and the obstacles around the vehicle can be monitored, as shown in FIG. 9.

In some embodiments, the environment sensing system further includes a GPS satellite positioning module, which can be used to obtain real-time position data of the movable platform for route planning of the movable platform. GPS is a global satellite positioning system that allows movable platforms (such as vehicles) to identify their specific positions in real time, which is important for route navigation planning in autonomous driving systems. After the destination is determined, GPS satellite data can be used to guide the movable platform (such as a vehicle) toward the right direction and road.

Figure 10:
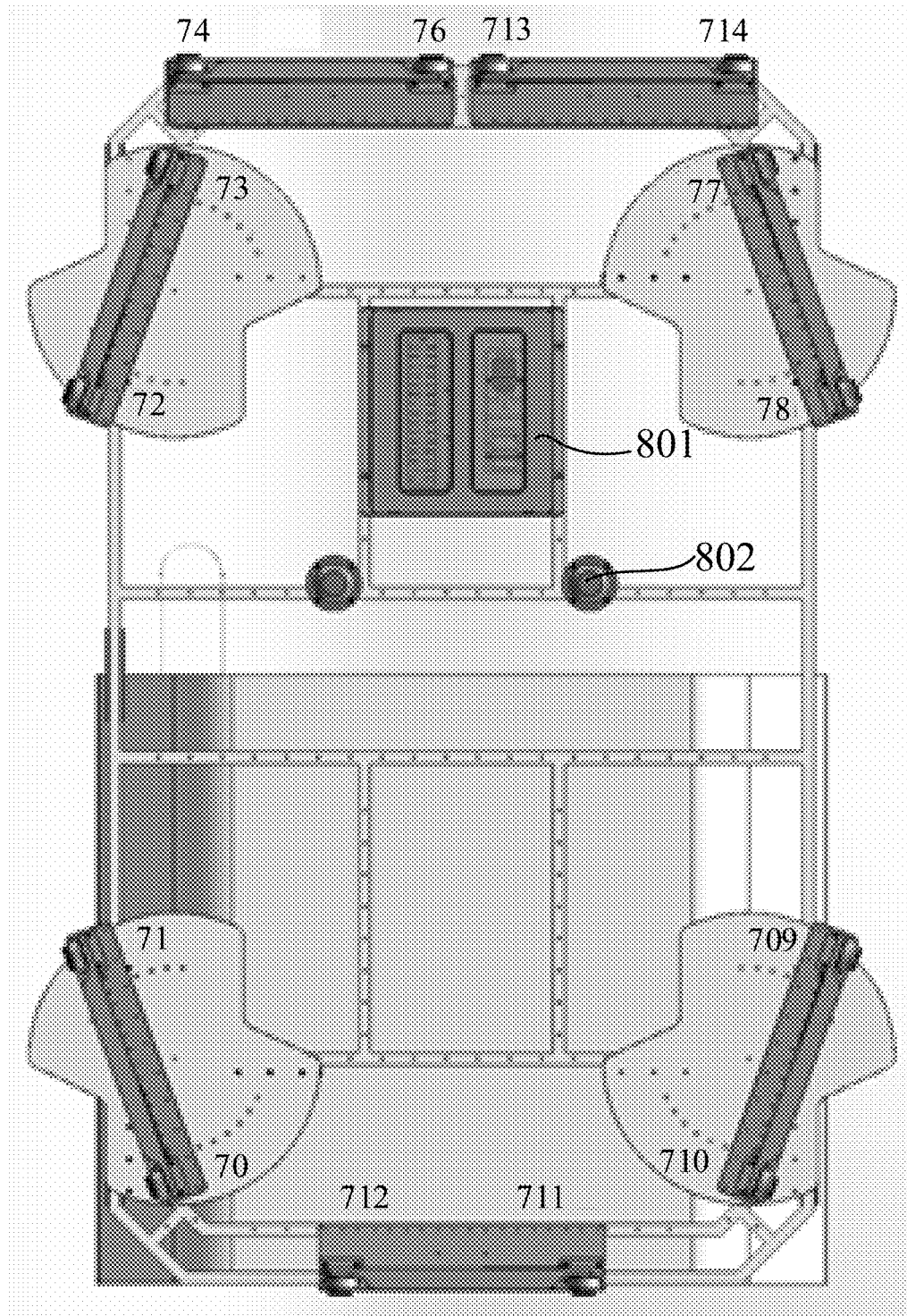
FIG. 10 is a schematic diagram of an arrangement of an inertial measurement unit (IMU) and an RTK antenna included in the environment sensing system according to an embodiment of the present disclosure.

In some embodiments, as shown in FIG. 10, the environment sensing system further includes an inertial measurement unit (IMU) 801 for real-time output of the angular velocity and acceleration of the measured object in the 3D space. The IMU can output the angular velocity and acceleration of the measured object in the 3D space in real time. Although in long-term positioning, the cumulative error of IMU will become larger and larger, but it can provide higher frequency and accurate measurement results, especially in the absence of other observations in some extreme conditions (such as in tunnels), IMU can still provide effective information.

In some embodiments, as shown in FIG. 10, the environment sensing system further includes an RTK antenna 802, which can be used to send the carrier phase collected by the reference station to the user receiver for the purpose of calculating the coordinates. The RTK technology can send the carrier phase collected by the reference station to the user receiver to calculate the difference and the coordinates. In the presence of a base station, the RTK antenna can obtain centimeter-level positioning accuracy in rea time, and provide accurate position information to the positioning module.

In some embodiments, the IMU and the RTK antenna may be embedded in the movable platform, such as embedded in the body of the vehicle, or the IMU and the RTK antenna may be externally mounted outside the movable platform together with the aforementioned camera module, laser detection module, etc., such as placing the IMU and the RTK antenna outside the body of the vehicle through a bracket mounted on the top of the vehicle.

In some embodiments, the environment sensing system may also include a speedometer for measuring the distance traveled by the wheels. The speedometer can measure the distance traveled by the wheels. In the vehicle positioning module, the real-time positioning module can provide more accurate distance driving information, especially in the case of loss of GPS data, it can provide a better estimate of the driving distance. The data provided by the two sensors can be used in the vehicle positioning system to realize real-time estimation of the vehicle position, such that the vehicle can move towards the correct destination.

Figure 11:
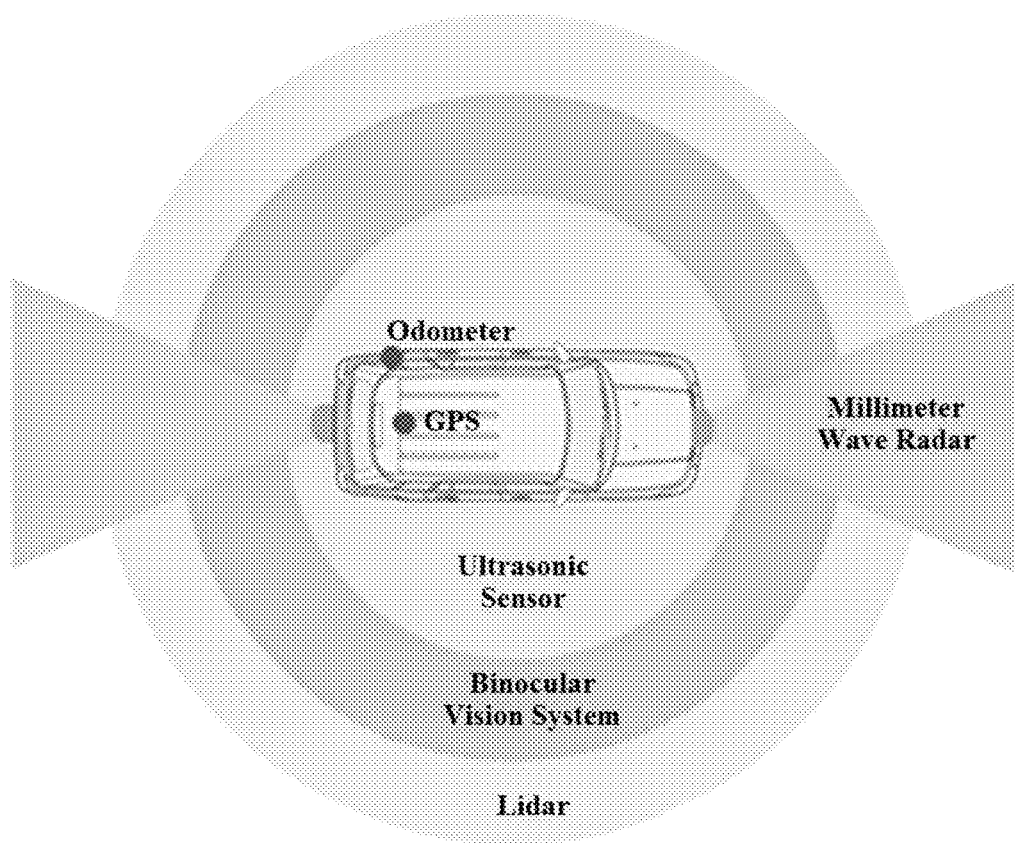
FIG. 11 is a system framework diagram of the environment sensing system according to another embodiment of the present disclosure.

FIG. 11 illustrates a system framework diagram of the environment sensing system provided in the present disclosure, as well as the various modules included in the environment sensing system and the system detection coverage.

As shown in FIG. 11, the detection range of the millimeter wave radar is generally within 150 m, while the detection range of the binocular vision system, that is, the camera module is generally within 80 m. The detection range of the ultrasonic sensor is generally within 10 m, and the detection range of the environment sensing system, that is, the lidar, is generally within 200 m, such as 5-100 m.

When the environment sensing system includes both a laser detection module and a camera module, the two modules can simultaneously sense the 360° of the environment around the movable platform while the movable platform is moving. The camera module and the laser detection module can cooperate with each other to increase the detection coverage. If any one of the modules fails, the other module can play a good supplementary role and still be able to detect the 360° range around the movable platform, thereby ensuring the normal movement of the movable platform (such as a vehicle) and the safety of driving.

Through the combination of data of the various sensors described above, the positioning module set in the movable platform (such as a vehicle) can provide stable and reliable attitude information.

Consistent with the present disclosure, the sensors used in the present disclosure include the scanning lidar, visible light camera, millimeter wave radar, ultrasonic sensor, speedometer, IMU, GPS, etc. to realize 360° sensing of the surrounding environment without blind spots, and provide stable and reliable environment sensing data with less redundancy. The sensors can be calibrated conveniently and quickly, and can meet the needs of real-time calibration result verification. In addition, different sensors can form a set of independent sensor modules to cover specific detection areas and ranges. Combining the information of all sensors, the data of the surrounding environment can be obtained in real time, and the drivable road surface, as well as other pedestrians and vehicles can be detected, and the a planning module can guide the movable platform (such as a vehicle) to drive automatically.

The environment sensing system described above can be used to sense external environmental information, such as distance information, angle information, reflection intensity information, speed information, etc. of targets in the environment. More specifically, the environment sensing system provided by the embodiments of the present disclosure can be applied to a movable platform, and the environment sensing system can be installed on the platform body of the movable platform. A movable platform with an environment sensing system can measure the external environment, such as measuring the distance between the movable platform and obstacles for obstacle avoidance and other purposes, and for 2D or 3D mapping of the external environment. In some embodiments, the movable platforms may include aircrafts (such as UAVs), vehicles (such as unmanned vehicles), ships, and remote-controlled vehicles. When the environment sensing system is applied to a UAV, the platform body may be the body of the UAV. When the environment sensing system is applied to a vehicle, the platform body may be the body of the vehicle. The vehicle may be a self-driving vehicle or a semi-self-driving vehicle, which is not limited in the embodiments of the present disclosure.

The structure of a lidar provided in the embodiments of the present disclosure will be described with reference to FIG. 12 and FIG. 13. The lidar is merely used as an example, and other suitable lidars can also be applied to the present disclosure.

The various sensors described in each embodiment of the present disclosure can be applied to a distance measuring device. The distance measuring device may be an electronic device such as a lidar, a laser distance measuring device, etc. In some embodiments, the distance measuring device may be used to detect external environment information, such as distance information, orientation information, reflection intensity information, speed information, etc. of targets in the environment. In some embodiments, the distance measuring device may detect the distance between an object to be detected and the distance measuring device by measuring the time of light propagation between the distance measuring device and the object to be detected, that is, the time-of-flight (TOF). Alternatively, the distance measuring device may also detect the distance between the object to be detected and the distance measuring device through other technologies, such as a distance measuring method based on phase shift measurement or a distance measuring method based on frequency shift measurement, which is not limited in the embodiments of the present disclosure.

For ease of understanding, the working process of distance measurement will be described by an example in conjunction with a distance measuring device 100 shown in FIG. 12.

Figure 12:
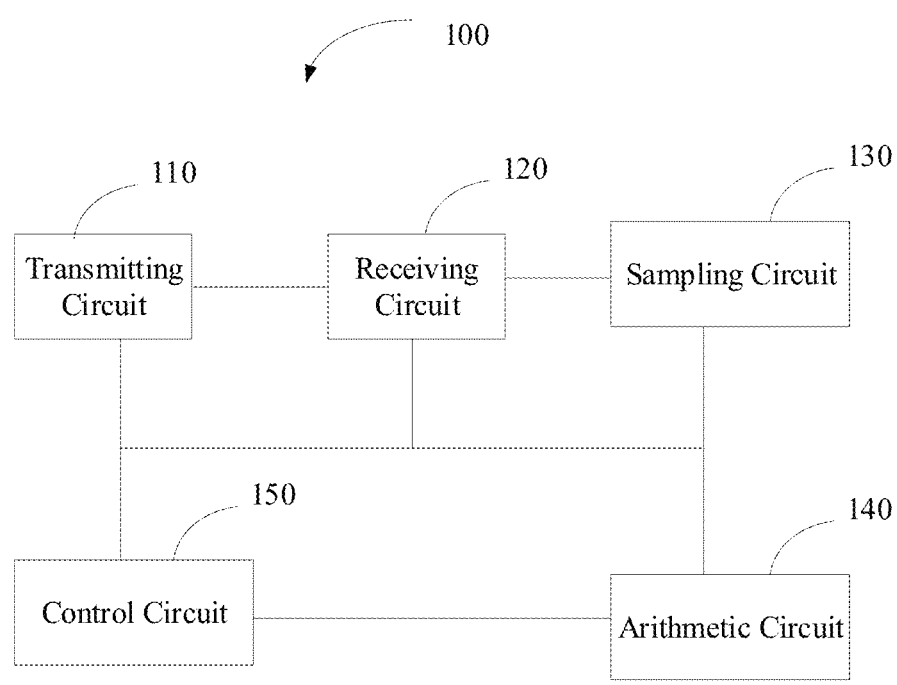
FIG. 12 is a schematic structural diagram of a laser distance measuring device according to an embodiment of the present disclosure.

As shown in FIG. 12, the distance measuring device 100 includes a transmitting circuit 110, a receiving circuit 120, a sampling circuit 130, and an arithmetic circuit 140.

The transmitting circuit 110 may emit a light pulse sequence (e.g., a laser pulse sequence). The receiving circuit 120 may receive the light pulse sequence reflected by the object to be detected, and perform photoelectric conversion on the light pulse sequence to obtain an electrical signal. After the electrical signal is processed, it may be output to the sampling circuit 130. The sampling circuit 130 may sample the electrical signal to obtain a sampling result. The arithmetic circuit 140 may determine the distance between the distance measuring device 100 and the object to be detected based on the sampling result of the sampling circuit 130.

In some embodiments, the distance measuring device 100 may also include a control circuit 150, the control circuit 150 may be used to control other circuits. For example, the control circuit 150 may control the working time of each circuit and/or set the parameters of each circuit.

It can be understood that although the distance measuring device shown in FIG. 12 includes a transmitting circuit, a receiving circuit, a sampling circuit, and an arithmetic circuit to emit a light beam for detection, the embodiments of the present disclosure are not limited thereto. The number of any one of the transmitting circuit, the receiving circuit, the sampling circuit, and the arithmetic circuit may also be two or more to emit two or more light beams in the same direction or different directions. In some embodiments, the two or more light beams may be emitted at the same time, or may be emitted at different times.

In some embodiments, in addition to the circuits shown in FIG. 12, the distance measuring device 100 may further include a scanning module 160. The scanning module 160 may be used to change the propagation direction of the laser pulse sequence emitted by the transmitting circuit and emit it.

In some embodiments, a module including the transmitting circuit 110, the receiving circuit 120, the sampling circuit 130, and the arithmetic circuit 140 or a module including the transmitting circuit 110, the receiving circuit 120, the sampling circuit 130, the arithmetic circuit 140, and the control circuit 150 can be referred to as a distance measurement module. The distance measurement module may be independent of other modules, such as the scanning module.

A coaxial optical path can be used in the distance measuring device. That is, the light beam emitted by the distance measuring device and the reflected light beam can share at least part of the optical path in the distance measuring device. Alternatively, the distance measuring device may also use an off-axis optical path. That is, the light beam emitted by the distance measuring device and the reflected light beam can be transmitted along different optical paths in the distance measuring device. FIG. 13 is a block diagram of the distance measuring device using a coaxial optical path according to an embodiment of the present disclosure.

The distance measuring device 100 includes an optical transceiver 110. The optical transceiver 110 includes a light source 103 (including the transmitting circuit described above), a collimating element 104, and a detector 105 (which may include the receiving circuit, the sampling circuit, and the arithmetic circuit described above), and an optical path changing element 106. The optical transceiver 110 may be used to emit light beams, receive returned light, and convert the returned light into electrical signals. The light source 103 may be used to emit a light beam. In some embodiments, the light source 103 may emit a laser beam. In some embodiments, the laser beam emitted by the light source 103 may be a narrow-bandwidth beam with a wavelength outside the visible light range. The collimating element 104 may be disposed on the exit light path of the light source, and configured to collimate the light beam emitted from the light source 103 and collimate the light beam emitted from the light source 103 into parallel light. The collimating element 104 may also be configured to condense at least a part of the returned light reflected by the object to be detected. The collimating element 104 may be a collimating lens or other elements capable of collimating light beams.

Figure 13:
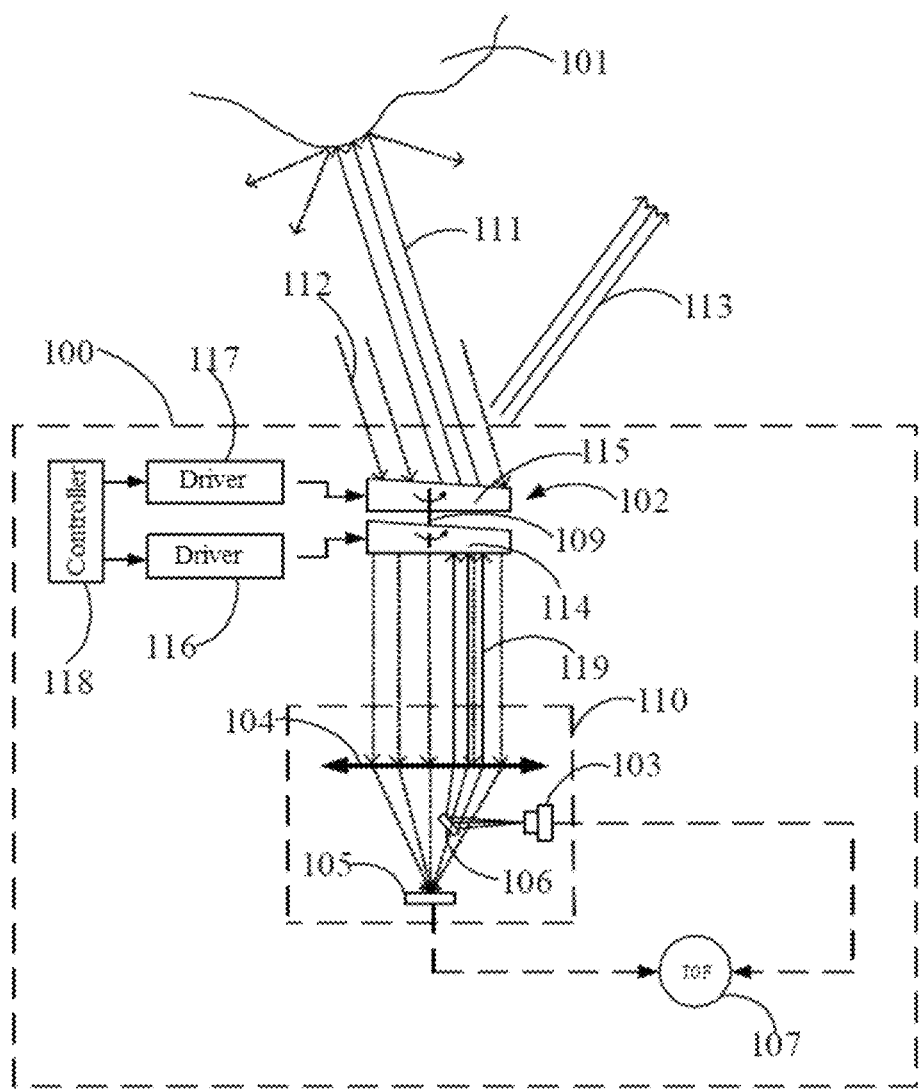
FIG. 13 a schematic diagram of the laser distance measuring device according to another embodiment of the present disclosure.

In the embodiment shown in FIG. 13, the optical path changing element 106 may combine the transmitting light path and the receiving light path in the distance measuring device before the collimating element 104, such that the transmitting light path and the receiving light path can share the same collimating element, making the light path more compact. In other embodiments, the light source 103 and the detector 105 may use respective collimating elements, and the optical path changing element 106 may be disposed behind the collimating elements.

In the embodiment shown in FIG. 13, since the beam divergence angle of the light beam emitted by the light source 103 is relatively small, and the beam divergence angle of the returned light received by the distance measuring device is relatively large, the optical path changing element 106 may use a small reflector to combine the transmitting light path and the receiving light path. In other embodiments, the optical path changing element 106 may also be a reflector with a through hole, where the through hole can be used to transmit the emitted light of the light source 103, and the reflector may be used to reflect the returned light to the detector 105. In this way, the chances of the support of the small reflector blocking the returned light can be reduced.

In the embodiment shown in FIG. 13, the optical path changing element 106 deviates from the optical axis of the collimating element 104. In other embodiments, the optical path changing element 106 may also be positioned on the optical axis of the collimating element 104.

The distance measuring device 100 further includes a scanning module 102. The scanning module 102 may be positioned on the exit light path of the optical receiver 100. The scanning module 102 may be used to change the transmission direction of a collimated light beam 119 emitted by the collimating element 104, project the collimated light beam 119 to the external environment, and project the returned light to the collimating element 104. The returned light can be collected on the detector 105 via the collimating element 104.

In some embodiments, the scanning module 102 may include one or more optical elements, such as lens, mirrors, prisms, optical phased array, or any combination of the above optical elements. In some embodiments, the plurality of optical elements of the scanning module 102 may rotate around a common axis 109, an each rotating optical element may be used to continuously change the propagation direction of the incident light beam. In some embodiments, the plurality of optical elements of the scanning module 102 may rotate at different speeds. In other embodiments, the plurality of optical elements of the scanning module 102 may rotate at substantially the same speed.

In some embodiments, the plurality of optical elements of the scanning module 102 may also rotate around different axes. In some embodiments, the plurality of optical elements of the scanning module 102 may also rotate in the same direction or in different directions, or vibrate in the same direction or different directions, which is not limited in the embodiments of the present disclosure.

In some embodiments, the scanning module 102 may include a first optical element 114 and a driver 116 connected to the first optical element 114. The driver 116 can be used to drive the first optical element 114 to rotate around the rotation axis 109 such that the first optical element 114 can change the direction of the collimated light beam 119. The first optical element 114 can project the collimated light beam 119 to different directions. In some embodiments, the angle between the direction of the collimated light beam 119 changed by the first optical element 114 and the rotation axis 109 may change as the first optical element 114 rotates. In some embodiments, the first optical element 114 may include a pair of opposite non-parallel surface through which the collimated light beam 119 can pass. In some embodiments, the first optical element 114 may include a prism whose thickness may vary along one or more radial directions. In some embodiments, the first optical element 114 may include a wedge-angle prism to refract the collimated light beam 119. In some embodiments, the first optical element 114 may be coated with an anti-reflection coating, and the thickness of the anti-reflection coating may be equal to the wavelength of the light beam emitted by the light source 103, which can increase the intensity of the transmitted light beam.

In some embodiments, the scanning module 102 may further include a second optical element 115. The second optical element 115 may rotate around the rotation axis 109, and the rotation speed of the second optical element 115 may be different from the rotation speed of the first optical element 114. The second optical element 115 may be used to change the direction of the light beam projected by the first optical element 114. In some embodiments, the second optical element 115 may be connected to a driver 117, and the driver 117 can drive the second optical element 115 to rotate. The first optical element 114 and the second optical element 115 can be driven by different drivers, such that the rotation speed of the first optical element 114 and the second optical element 115 can be different, such that the collimated light beam 119 can be projected to different directions in the external space, and a larger spatial range can be scanned. In some embodiments, a controller 118 may be used to control the driver 116 and the driver 117 to drive the first optical element 114 and the second optical element 115, respectively. The rotation speeds of the first optical element 114 and the second optical element 115 may be determined based on the area and pattern expected to be scanned in actual applications. The driver 116 and the driver 117 may include motors or other driving devices.

In some embodiments, the second optical element 115 may include a pair of opposite non-parallel surfaces through which the light beam can pass. In some embodiments, the second optical element 115 may include a prism whose thickness may vary in one or more radial directions. In some embodiments, the second optical element 115 may include a wedge prism. In some embodiments, the second optical element 115 may be coated with an anti-reflection coating to increase the intensity of the transmitted light beam.

The rotation of the scanning module 102 may project light in different directions, such as directions 111 and 113. In this way, the space around the distance measuring device 100 can be scanned. When the light projected by the scanning module 102 hits an object to be detected 101, a part of the light may be reflected by the object to be detected 101 to the distance measuring device 100 in a direction opposite to direction 111. The scanning module 102 can may receive a returned light 112 reflected by the object to be detected 101 and project the returned light 112 to the collimating element 104.

The collimating element 104 may converge at least a part of the returned light 112 reflected by the object to be detected 101. In some embodiments, an anti-reflection coating may be coated on the collimating element 104 to increase the intensity of the transmitted light beam. The detector 105 and the light source 103 may be disposed on the same side of the collimating element 104, and the detector 105 may be used to convert at least part of the returned light passing through the collimating element 104 into an electrical signal.

In some embodiments, the light source 103 may include a laser diode through which nanosecond laser light can be emitted. For example, the laser pulse emitted by the light source 103 may last for 10 ns. Further the laser pulse receiving time may be determined, for example, by detecting the rising edge time and/or falling edge time of the electrical signal pulse to determine the laser pulse receiving time. In this way, the distance measuring device 100 may calculate the TOF using the pulse receiving time information and the pulse sending time information, thereby determining the distance between the object to be detected 101 and the distance measuring device 100.

In some embodiments, the distance and orientation detected by the distance measuring device 100 can be used for remote sensing, obstacle avoidance, surveying and mapping, modeling, navigation, and the like.

In some embodiments, the movable platform may include at least one of an unmanned aircraft, a vehicle, a remote control vehicle, a robot, or a camera. When the distance measuring device is implemented in an unmanned aircraft, the main body of the movable platform may be the aircraft body of the unmanned aircraft. When the distance measuring device is implemented in a vehicle, the main body of the movable platform may be the body of the vehicle. The vehicle can be a self-driving vehicle or a semi-self-driving vehicle, which is not limited in the embodiments of the present disclosure. When the distance measuring device is implemented in a remote control vehicle, the main body of the movable platform may be the body of the remote control vehicle. When the distance measuring device is implemented in a robot, the main body of the movable platform may be the body of the robot. When the distance measuring device is implemented in a camera, the main body of the movable platform may be the body of the camera.

The distance measuring device, such as a lidar, described above is merely an example that can be applied to an environment sensing system, and other types of lidars can also be applied to the present disclosure, which will not be repeated here.

Although the embodiments of the present disclosure have been shown and described above, it can be understood that the above embodiments are exemplary and should not be construed as limitations on the present disclosure. Those skilled in the art can change, modify, substitute, or vary the above embodiments within the scope of the present disclosure. The scope of the present disclosure is defined by the appended claims and their equivalents.

A person having ordinary skill in the art can appreciate that various units or steps of the disclosed algorithms may be implemented using related electrical hardware, or a combination of electrical hardware and computer software that may control the electrical hardware. Whether the implementation of the functions is through hardware or software is to be determined based on specific application and design constraints. A person of ordinary skill in the art may use different methods to implement the functions for different applications. Such implementations do not fall outside of the scope of the present disclosure.

A person having ordinary skill in the art can appreciate that the device and method illustrated in the example embodiments may be implemented in other ways. For example, the disclosed embodiments for the device are for illustrative purpose only. Any division of the units are logic divisions. Actual implementation may use other division methods. For example, multiple units or components may be combined, or may be integrated into another system, or some features may be omitted or not executed.

In the specification provided herein, a plenty of specific details are described. However, it can be appreciated that embodiments of the present disclosure may be practiced without these specific details. In some embodiments, well known methods, structures and technologies are not illustrated in detail so as not to obscure the understanding of the specification.

Similarly, it shall be appreciated that in order to simplify the disclosure and help the understanding of one or more of all the inventive aspects, in the above description of the exemplary embodiments of the present disclosure, sometimes individual features of the present disclosure are grouped together into a single embodiment, figure or the description thereof. However, the disclosed methods should not be construed as reflecting the following intention, namely, the claimed invention claims more features than those explicitly recited in each claim. More precisely, as reflected in the following claims, an aspect of the invention lies in being less than all the features of individual embodiments disclosed previously. Therefore, the claims complying with a particular implementation are hereby incorporated into the particular implementation, wherein each claim itself acts as an individual embodiment of the present disclosure.

It may be appreciated to those skilled in the art that modules in a device in an embodiment may be changed adaptively and arranged in one or more device different from the embodiment. Modules or units or assemblies may be combined into one module or unit or assembly, and additionally, they may be divided into multiple sub-modules or sub-units or subassemblies. Except that at least some of such features and/or procedures or units are mutually exclusive, all the features disclosed in the specification (including the accompanying claims, abstract and drawings) and all the procedures or units of any method or device disclosed as such may be combined employing any combination. Unless explicitly stated otherwise, each feature disclosed in the specification (including the accompanying claims, abstract and drawings) may be replaced by an alternative feature providing an identical, equal or similar objective.

Furthermore, it can be appreciated to the skilled in the art that although some embodiments described herein comprise some features and not other features comprised in other embodiment, a combination of features of different embodiments is indicative of being within the scope of the present disclosure and forming a different embodiment. For example, in the following claims, any one of the claimed embodiments may be used in any combination.

Embodiments of the individual components of the present disclosure may be implemented in hardware, or in a software module running on one or more processors, or in a combination thereof. It will be appreciated by those skilled in the art that, in practice, some or all of the functions of some or all of the components in an apparatus for installing an application program based on an intelligent terminal device according to individual embodiments of the present disclosure may be realized using a microprocessor or a digital signal processor (DSP). The present disclosure may also be implemented as a device or apparatus program (e.g., a computer program and a computer program product) for carrying out a part or all of the method as described herein. Such a program implementing the present disclosure may be stored on a computer readable medium, or may be in the form of one or more signals. Such a signal may be obtained by downloading it from an Internet website, or provided on a carrier signal, or provided in any other form.

It is to be noted that the detailed description of the present disclosure in the above embodiments does not limit the present disclosure, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The present disclosure may be implemented by means of a hardware comprising several distinct elements and by means of a suitably programmed computer. In a unit claim enumerating several apparatuses, several of the apparatuses may be embodied by the same hardware item. Use of the terms such as "first," "second," and "third," etc. does not indicate any order, and these terms can be construed as names.

What is claimed is:

1. An environment sensing system comprising:
a laser detection module, the laser detection module including a first laser module, a second laser module, a third laser module, and a fourth laser module, a field of view (FOV) angle of each laser module being less than or equal to 120°, wherein
the first laser module and the second laser module are disposed on a front side of a movable platform to detect an area in front of the movable platform, the FOVs of the first laser module and the second laser module partially overlap;
the third laser module and the fourth laser module are respectively disposed on both sides of the movable platform to detect a front left area and a front right area of the movable platform;
an overlap percentage of the FOV of the first laser module and the second laser module is greater than 30% of the FOV of the first laser module or the second laser module;
the overlap percentage of the FOV of the third laser module and the first laser module is greater than 10% of the FOV of the third laser module or the first laser module; and
the overlap percentage of the FOV of the fourth laser module and the second laser module is greater than 10% of the FOV of the fourth laser module or the second laser module.

2. The environment sensing system of claim 1, wherein:
the third laser module is disposed on a front left side of the movable platform, and the fourth laser module is disposed on a front right side of the movable platform.

3. The environment sensing system of claim 1, wherein;
the movable platform includes a vehicle, and the third laser module and the fourth laser module are respectively disposed at rearview mirrors on both sides of the vehicle.

4. The environment sensing system of claim 1, wherein:
the first laser module and the second laser module are respectively disposed at both ends of the front side of the movable platform.

5. The environment sensing system of claim 1, wherein:
the FOVs of the third laser module and the first laser module partially overlap, and the FOVs of the fourth laser module and the second laser module partially overlap.

6. The environment sensing system of claim 1, wherein:
the laser detection module further includes a fifth laser module disposed on the front side of the movable platform to detect the area in front of the movable platform.

7. The environment sensing system of claim 1, wherein:
the laser detection module further includes a sixth laser module and a seventh laser module respectively disposed on a left side and a right side of the movable platform to detect a rear left area and a rear right area of the movable platform.

8. The environment sensing system of claim 7, wherein:
the sixth laser module is disposed on a rear left side of the movable platform, and the seventh laser module is disposed on a rear right side of the movable platform.

9. The environment sensing system of claim 7, wherein:
the FOVs of the sixth laser module and the seventh laser module partially overlap behind the movable platform, and the overlap percentage of the FOV of the sixth laser module and the seventh laser module is greater than 10% of the FOV of the sixth laser module or the seventh laser module.

10. The environment sensing system of claim 1, wherein:
a horizontal FOV angle of each laser module ranges from 40° to 120°.

11. The environment sensing system of claim 1, wherein:
the FOV angle of each laser module is less than or equal to 100°.

12. The environment sensing system of claim 1, wherein:
each laser module includes two or more lidars, and optical axes of the two or more lidars are at a predetermined angle to cause the FOVs of two adjacent lidars to have an overlapping part.

13. The environment sensing system of claim 12, wherein:
a percentage of the overlapping part in the FOV of any lidar ranges from 5% to 90%.

14. The environment sensing system of claim 1, wherein:
each laser module includes three lidars, and optical axes of the three lidars are at a predetermined angle to cause the FOVs of two adjacent lidars to have an overlapping part.

15. The environment sensing system of claim 14, wherein:
the angle between the optical axes of adjacent lidars in the three lidars is substantially 30°.

16. The environment sensing system of claim 1, wherein:
a lidar is placed on the front side of the movable platform, and a detection distance of the lidar is greater than the detection distance of the first laser module and the second laser module.

17. The environment sensing system of claim 1, wherein:
the laser detection module further includes a first lidar disposed on a rear side of the movable platform to detect an area behind the movable platform.

18. The environment sensing system of claim 1, wherein:
the laser detection module further includes a second lidar and a third lidar respectively disposed on both sides of the movable platform to detect a rear left area and a rear right area of the movable platform.

19. The environment sensing system of claim 18, wherein:
the second lidar is disposed above or below the third laser module to cause the FOVs of the second lidar and the third laser module to partially overlap; and
the third lidar is disposed above or below the fourth laser module to cause the FOVs of the third lidar and the fourth laser module to partially overlap.

* * * * *